(12) United States Patent
Isogai et al.

(10) Patent No.: US 9,147,278 B2
(45) Date of Patent: Sep. 29, 2015

(54) PARALLAX IMAGE GENERATION DEVICE, PARALLAX IMAGE GENERATION METHOD, PROGRAM, AND INTEGRATED CIRCUIT

(75) Inventors: Kuniaki Isogai, Osaka (JP); Masayuki Misaki, Hyogo (JP); Junichi Tagawa, Kyoto (JP); Takashi Kawamura, Kyoto (JP); Takashi Fujii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 351 days.

(21) Appl. No.: 13/814,514

(22) PCT Filed: Jun. 5, 2012

(86) PCT No.: PCT/JP2012/003681
§ 371 (c)(1),
(2), (4) Date: Feb. 6, 2013

(87) PCT Pub. No.: WO2012/169173
PCT Pub. Date: Dec. 13, 2012

(65) Prior Publication Data
US 2013/0127846 A1    May 23, 2013

(30) Foreign Application Priority Data
Jun. 8, 2011    (JP) .................................. 2011-128704

(51) Int. Cl.
*H04N 13/00* (2006.01)
*G06T 15/00* (2011.01)
*H04N 13/04* (2006.01)

(52) U.S. Cl.
CPC ............ *G06T 15/00* (2013.01); *H04N 13/0022* (2013.01); *H04N 13/0404* (2013.01); *H04N 13/0438* (2013.01); *H04N 2013/0081* (2013.01)

(58) Field of Classification Search
CPC .......... H04N 13/0018; H04N 13/0022; H04N 13/0409; H04N 13/0007; H04N 13/026; H04N 2213/003; H04N 2013/0081
USPC ............ 348/42–44, 54, 58; 345/419; 382/154
See application file for complete search history.

(56) References Cited

U.S. PATENT DOCUMENTS 5,083,199 A * 1/1992 Borner ........................... 348/59
6,108,005 A   8/2000 Starks et al.
(Continued)

FOREIGN PATENT DOCUMENTS

CN    101589626    11/2009
EP    2 463 853    6/2012
(Continued)

OTHER PUBLICATIONS

International Search Report issued Jul. 3, 2012 in International (PCT) Application No. PCT/JP2012/003681.
(Continued)

*Primary Examiner* — Victor Kostak
(74) *Attorney, Agent, or Firm* — Wenderoth, Lind & Ponack, L.L.P.

(57) ABSTRACT

A parallax image generation device includes: a depth value correction unit which performs correction processing on a depth value, from among a plurality of depth values which define a depth image, to shift a position corresponding to the depth value to be closer to a display screen as the depth value is located closer to an end of the depth image, the display screen being for displaying a parallax image; and a parallax image generation unit which generates a first parallax image and a second parallax image having mutual parallax, using a two-dimensional image and the depth image corrected through the correction processing.

14 Claims, 21 Drawing Sheets

(56) References Cited

U.S. PATENT DOCUMENTS

| | | | |
|---|---|---|---|
| RE39,342 E * | 10/2006 | Starks et al. | 345/419 |
| 7,679,641 B2 | 3/2010 | Lipton et al. | |
| 8,130,259 B2 | 3/2012 | Ishiyama et al. | |
| 8,472,704 B2 | 6/2013 | Ishiyama et al. | |
| 2005/0254702 A1* | 11/2005 | Era | 382/154 |
| 2007/0236560 A1 | 10/2007 | Lipton et al. | |
| 2010/0060717 A1 | 3/2010 | Klein Gunnewiek et al. | |
| 2011/0157328 A1 | 6/2011 | Ishiyama et al. | |
| 2011/0193945 A1* | 8/2011 | Tsuchida | 348/51 |
| 2012/0019625 A1* | 1/2012 | Mishima et al. | 348/49 |
| 2012/0154530 A1* | 6/2012 | Yamada | 348/43 |
| 2012/0163701 A1* | 6/2012 | Gomi | 382/154 |
| 2012/0212478 A1* | 8/2012 | Tanaka | 345/419 |
| 2012/0219208 A1 | 8/2012 | Ishiyama et al. | |
| 2012/0287252 A1 | 11/2012 | Tsuchida | |

FOREIGN PATENT DOCUMENTS

| | | |
|---|---|---|
| JP | 2004-221699 | 8/2004 |
| JP | 2009-533897 | 9/2009 |
| JP | 2010-103866 | 5/2010 |
| JP | 2010-268097 | 11/2010 |
| JP | 2011-078109 | 4/2011 |
| JP | 2011-164202 | 8/2011 |
| WO | 98/09445 | 3/1998 |
| WO | 2007/117471 | 10/2007 |
| WO | 2008/068707 | 6/2008 |
| WO | 2011/052389 | 5/2011 |

OTHER PUBLICATIONS

Chinese Office Action with Search Report (with partial English translation) issued Jun. 3, 2015 in corresponding Chinese Application No. 201280002047.0.

* cited by examiner $$z' = \begin{cases} 0: (l = 0) \\ F(l,z): (0 < l < L) \\ z: (L \leq l) \end{cases} \cdots \text{(Equation 1)}$$

$$F(l,z) = \frac{l}{L} \times z \quad \cdots \text{(Equation 2)}$$

$$F(l,z) = z \times \sqrt{1 - (1 - \frac{l}{L})^2} \quad \cdots \text{(Equation 3)}$$

PARALLAX IMAGE GENERATION DEVICE, PARALLAX IMAGE GENERATION METHOD, PROGRAM, AND INTEGRATED CIRCUIT

TECHNICAL FIELD

The present invention relates to parallax image generation devices, parallax image generation methods, programs, and integrated circuits, for generating parallax images for depicting three-dimensional images.

BACKGROUND ART

In recent years, a variety of techniques are being developed for depicting a three-dimensional image using a plurality of images having parallax therebetween. When a three-dimensional image is depicted using images having parallax therebetween, there is a problem that an object in an end portion of the three-dimensional image suddenly loses the stereoscopic effect in the end portion, which makes the three-dimensional image look very unnatural.

In Patent Literature (PTL) 1, a technique is disclosed for solving such unnatural look of the three-dimensional image in the end portion (hereinafter refereed to as a conventional technique A).

CITATION LIST

Patent Literature

[PTL 1] Japanese Unexamined Patent Application Publication No. 2010-268097

SUMMARY OF INVENTION

Technical Problem

However, in the conventional technique A, a stereoscopic frame is disposed to cover an end portion of a three-dimensional image with the frame. Therefore, the conventional technique A has a problem that a display size of the three-dimensional image is decreased.

The present invention has been conceived in view of solving the above problem, and has an object to provide a parallax image generation device or the like by which unnatural depiction in an end portion of a three-dimensional image can be reduced without decreasing the size of the three-dimensional image.

Solution to Problem

In order to achieve the above object, a parallax image generation device according to an aspect of the present invention performs processing using a depth image for generating, from a two-dimensional image that is a processing target, two parallax images necessary for depicting a three-dimensional image, the parallax images having mutual parallax. The depth image is defined by a plurality of depth values. The parallax image generation device includes: a depth value correction unit configured to perform correction processing on a depth value, from among the depth values which define the depth image, to shift a position corresponding to the depth value to be closer to a display screen as the depth value is located closer to an end of the depth image, the display screen being for displaying a parallax image; and a parallax image generation unit configured to generate a first parallax image and a second parallax image having mutual parallax, using the two-dimensional image and the depth image corrected through the correction processing.

It is to be noted that a general or specific aspects of the above may be implemented by a system, a method, an integrated circuit, a computer program, or a recording medium, and an arbitrary combination of a system, a method, an integrated circuit, a computer program, or a recording medium.

Advantageous Effects of Invention

With the present invention, unnatural depiction in an end portion of a three-dimensional image can be reduced without decreasing the size of the three-dimensional image.

DESCRIPTION OF EMBODIMENTS

Figure 1:
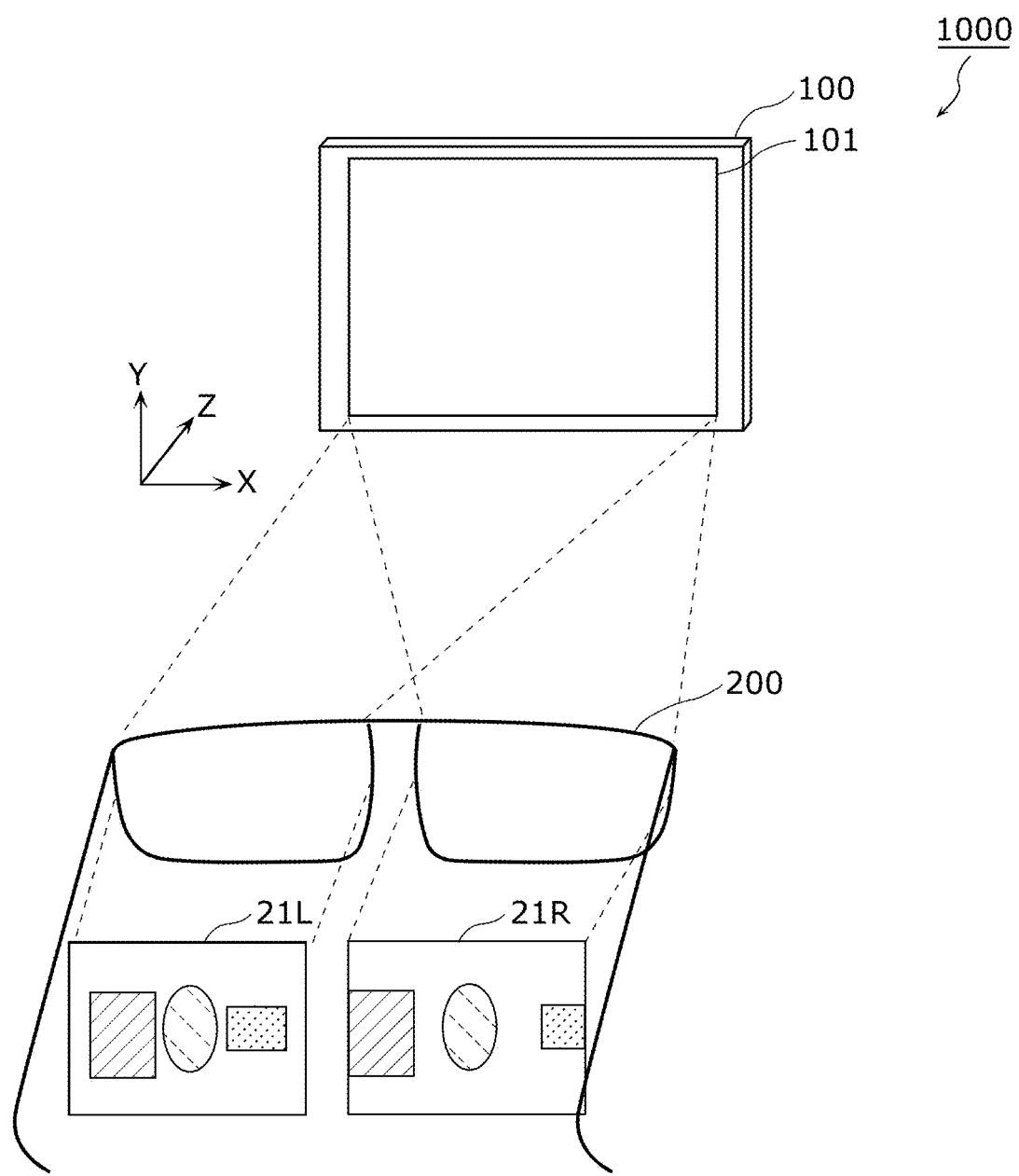
FIG. 1 shows an example of a configuration of a three-dimensional image viewing system according to Embodiment 1 of the present invention.

In order to achieve the above object, a parallax image generation device according to an aspect of the present invention performs processing using a depth image for generating, from a two-dimensional image that is a processing target, two parallax images necessary for depicting a three-dimensional image, the parallax images having mutual parallax. The depth image is defined by a plurality of depth values. The parallax image generation device includes: a depth value correction unit configured to perform correction processing on a depth value, from among the depth values which define the depth image, to shift a position corresponding to the depth value to be closer to a display screen as the depth value is located closer to an end of the depth image, the display screen being for displaying a parallax image; and a parallax image generation unit configured to generate a first parallax image and a second parallax image having mutual parallax, using the two-dimensional image and the depth image corrected through the correction processing.

Here, it is assumed that an object A is displayed in the three-dimensional image in a manner that the object A overlaps an end of the three-dimensional image. In this case, in a three-dimensional image depicted by two parallax images generated from a two-dimensional image that is a processing target using a depth image on which the correction processing is not performed, it looks as if the object A is cut at the end of the three-dimensional image.

Meanwhile, in the present aspect, correction processing is performed on a depth value to shift a position corresponding to the depth value to be closer to a display screen as the depth value is located closer to an end of the depth image. Then, a first parallax image and a second parallax image are generated using the depth image corrected through the correction processing.

Thus, in the three-dimensional image depicted by the generated first parallax image and the generated second parallax image, unnaturalness can be reduced including it looks as if the object A is cut at the end of the three-dimensional image.

Accordingly, unnatural depiction of an object displayed in an end portion of a three-dimensional image can be reduced without decreasing the size of the three-dimensional image. Therefore, unnatural depiction in the end portion of the three-dimensional image can be reduced without decreasing the size of the three-dimensional image.

Furthermore, the depth value correction unit may be configured to perform the correction processing on depth values corresponding to a correction target area which is an area separated from the end of the depth image by up to L (an integer greater than or equal to 1) pixels out of the depth image.

Furthermore, the depth value correction unit may be configured to perform the correction processing on, from among the depth values corresponding to the correction target area, a depth value which is for depicting a part of pixels of the three-dimensional image in front of the display screen for displaying the generated first parallax image and the generated second parallax image.

Furthermore, the depth value correction unit may be configured to increase a value of the L as the two-dimensional image has a larger horizontal size.

Furthermore, the depth value correction unit may be configured to: extract, from among the depth values included in the correction target area, a depth value whose corresponding position is most separated from the display screen in front of the display screen; and increase a value of the L as the position corresponding to the extracted depth value is separated from the display screen in front of the display screen.

Furthermore, the depth value correction unit may be configured to perform the correction processing on at least one of (i) the correction target area in a right end and a left end of the depth image and (ii) the correction target area in an upper end and a lower end of the depth image.

Furthermore, the depth value correction unit may be configured to increase a value of the L for the correction target area in the right end and the left end of the depth image, when the two-dimensional image is an image captured while an imaging device is being panned.

Furthermore, the depth value correction unit may be configured to increase a value of the L for the correction target area in the upper end and the lower end of the depth image, when the two-dimensional image is an image captured while an imaging device is being tilted.

Furthermore, the depth value correction unit may be configured to increase a value of the L for the corresponding correction target area as the imaging device is being panned or tilted faster.

Furthermore, the depth value correction unit may be configured to expand, from among the correction target areas in the ends of the depth image, the correction target area in a direction in which the imaging device faces to be larger than the correction target area on the other side.

Furthermore, the depth value correction unit may be configured to correct, from among the depth values included in the depth image, a depth value located closest to the end of the depth image to be a value for depicting a pixel in the display screen for displaying the first parallax image and the second parallax image.

A parallax image generation method according to an aspect of the present invention is for performing processing using a depth image for generating, from a two-dimensional image that is a processing target, two parallax images necessary for depicting a three-dimensional image, the parallax images having mutual parallax. The depth image is defined by a plurality of depth values.

The parallax image generation method includes: correcting a depth value, from among the depth values which define the depth image, to shift a position corresponding to the depth value to be closer to a display screen as the depth value is located closer to an end of the depth image, the display screen being for displaying a parallax image; and generating a first parallax image and a second parallax image having mutual parallax, using the two-dimensional image and the depth image corrected in the correcting.

A program according to an aspect of the present invention is for performing processing using a depth image for generating, from a two-dimensional image that is a processing target, two parallax images necessary for depicting a three-dimensional image, the parallax images having mutual parallax. The depth image is defined by a plurality of depth values. The program causes the computer to execute: correcting a depth value, from among the depth values which define the depth image, to shift a position corresponding to the depth value to be closer to a display screen as the depth value is located closer to an end of the depth image, the display screen being for displaying a parallax image; and generating a first parallax image and a second parallax image having mutual parallax, using the two-dimensional image and the depth image corrected in the correcting.

An integrated circuit according to an aspect of the present invention performs processing using a depth image for generating, from a two-dimensional image that is a processing target, two parallax images necessary for depicting a three-dimensional image, the parallax images having mutual parallax. The depth image is defined by a plurality of depth values. The integrated circuit includes: a depth value correction unit configured to perform correction processing on a depth value, from among the depth values which define the depth image, to shift a position corresponding to the depth value to be closer to a display screen as the depth value is located closer to an end of the depth image, the display screen being for displaying a parallax image; and a parallax image generation unit configured to generate a first parallax image and a second parallax image having mutual parallax, using the two-dimensional image and the depth image corrected through the correction processing.

It is to be noted that a general or specific aspects of the above may be implemented by a system, a method, an integrated circuit, a computer program, or a recording medium, and an arbitrary combination of a system, a method, an integrated circuit, a computer program, or a recording medium.

Embodiments according to the present invention are described below with reference to the drawings.

It is to be noted that each of the embodiments described below is a specific example of the present invention. Numeric values, shapes, materials, constituents, positions and topologies of the constituents, steps, an order of the steps, and the like in the following embodiments are an example of the present invention, and it should therefore not be construed that the present invention is limited by these embodiments. Furthermore, out of the constituents in the following embodiments, the constituents not stated in the independent claims describing the broadest concept of the present invention are described as optional constituents.

Furthermore, the same constituents are assigned with the same numerals in the description below. The names and the function are also the same. Accordingly, detailed description on such constituents is omitted in some cases.

Embodiment 1

FIG. 1 shows an example of a configuration of a three-dimensional image viewing system 1000 according to Embodiment 1 of the present invention. In FIG. 1, X direction, Y direction, and Z direction are orthogonal to one another. X direction, Y direction, and Z direction shown in the subsequent drawings are also orthogonal to one another.

As shown in FIG. 1, the three-dimensional image viewing system 1000 includes a parallax image generation device 100 and active shutter glasses 200.

The parallax image generation device 100 is, for example, a plasma display, a liquid crystal display, an organic EL display, or the like. It is to be noted that the parallax image generation device 100 is not limited to the above displays but may be a digital video camera, a digital still camera, or the like. Furthermore, the parallax image generation device 100 may be a device incorporated in a display, a camera, or the like.

The parallax image generation device 100 includes a display screen 101 for displaying an image. It is assumed that the display screen 101 is parallel to XY plane. It is assumed that the display screen 101 is capable of displaying, as an example, an image including a plurality of pixels arranged in m (natural number) rows and n (natural number) columns.

Here, m is assumed to be 1080 and n is assumed to be 1920. Specifically, the display screen 101 is capable of displaying an image having a size of horizontally 1920 pixels by vertically 1080 pixels (hereinafter also referred to as a full HD size). Hereinafter, a size of an image which the display screen 101 is capable of displaying is also referred to as a displayable size.

It is to be noted that the displayable size is not limited to the full HD size but may be a size of horizontally 1366 pixels by vertically 768 pixels, for example.

In the present embodiment, the parallax image generation device 100 is a device which displays parallax image for depicting a three-dimensional image by a frame sequential method, as an example. In this case, the size of the parallax image displayed on the display screen 101 is equal to the displayable size.

It is to be noted that the display method of a three-dimensional image in the parallax image generation device 100 is not limited to the frame sequential method. The display method of a three-dimensional image in the parallax image generation device 100 may be a lenticular method, for example. In this case, the size of the three-dimensional image depicted by the image displayed on the display screen 101 is smaller than the displayable size.

A left-eye image 21L is an image to be shown to a left eye (hereinafter also referred to as a first viewpoint) of a user (viewer). A right-eye image 21R is an image to be shown to the right eye (hereinafter also referred to as a second viewpoint) of the user. The left-eye image 21L and the right-eye image 21R are two-dimensional images having mutual parallax.

The parallax image generation device 100 alternately displays the left-eye image 21L and the right-eye image 21R on the display screen 101.

When the left-eye image 21L is displayed on the display screen 101, the active shutter glasses 200 show only the left-eye image 21L to the left eye of the user by blocking light for the right eye of the user. Meanwhile, when the right-eye image 21R is displayed on the display screen 101, the active shutter glasses 200 show only the right-eye image 21R to the right eye of the user by blocking light for the left eye of the user.

The user wearing the active shutter glasses 200 having such a configuration can view the left-eye image 21L with the left eye, and view the right-eye image 21R with the right eye. Thus, the user can view the three-dimensional image depicted by the left-eye image 21L and the right-eye image 21R.

As described above, the display method of the three-dimensional image is not limited to the frame sequential method using the active shutter glasses 200. For example, the display method of the three-dimensional image may be a method using deflection glasses. Furthermore, for example, the display method of the three-dimensional image may be a method using a parallax barrier, a lenticular sheet, or the like.

Figure 2:
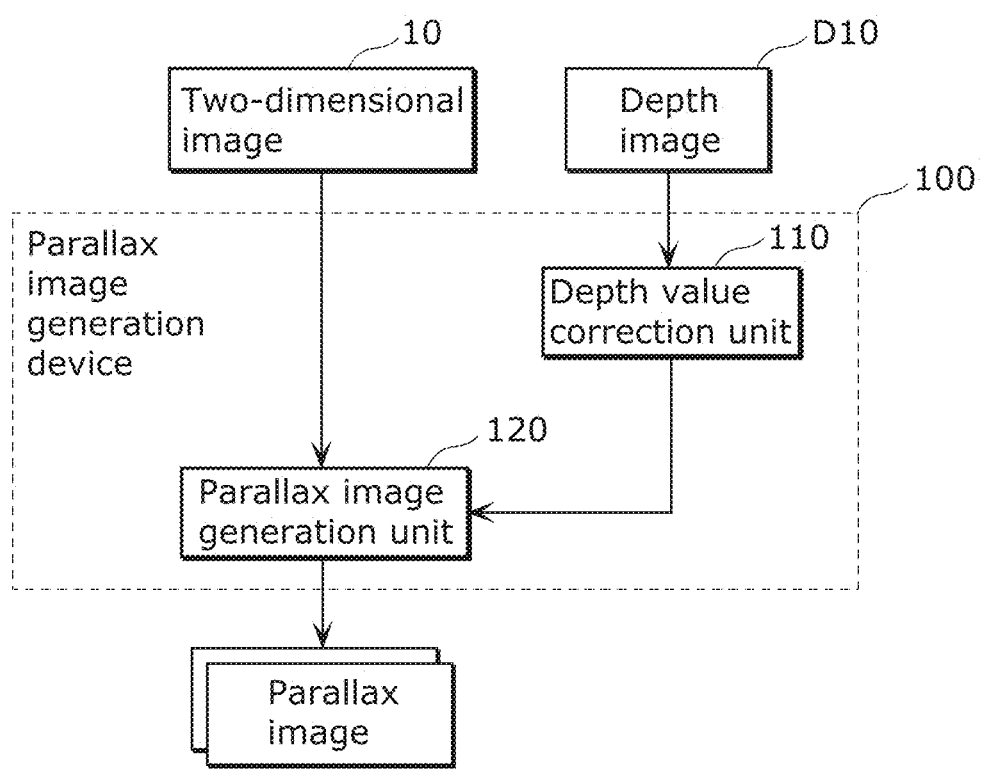
FIG. 2 shows an example of a configuration of a parallax image generation device according to Embodiment 1 of the present invention.

FIG. 2 shows an example of a configuration of the parallax image generation device 100 according to Embodiment 1 of the present invention.

As shown in FIG. 2, the parallax image generation device 100 includes a depth value correction unit 110 and a parallax image generation unit 120.

The depth value correction unit 110 performs processing using a depth image. Details are described later. The depth image corresponds to a depth map, for example. A depth image is an image which is used for generating, from a two-dimensional image that is a processing target, a left-eye image and a right-eye image as parallax images. Specifically, a depth image is an image for generating, from a two-dimensional image that is a processing target, two parallax images having mutual parallax. The two parallax images (a left-eye image and a right-eye image) are necessary for depicting a three-dimensional image.

Figure 3:
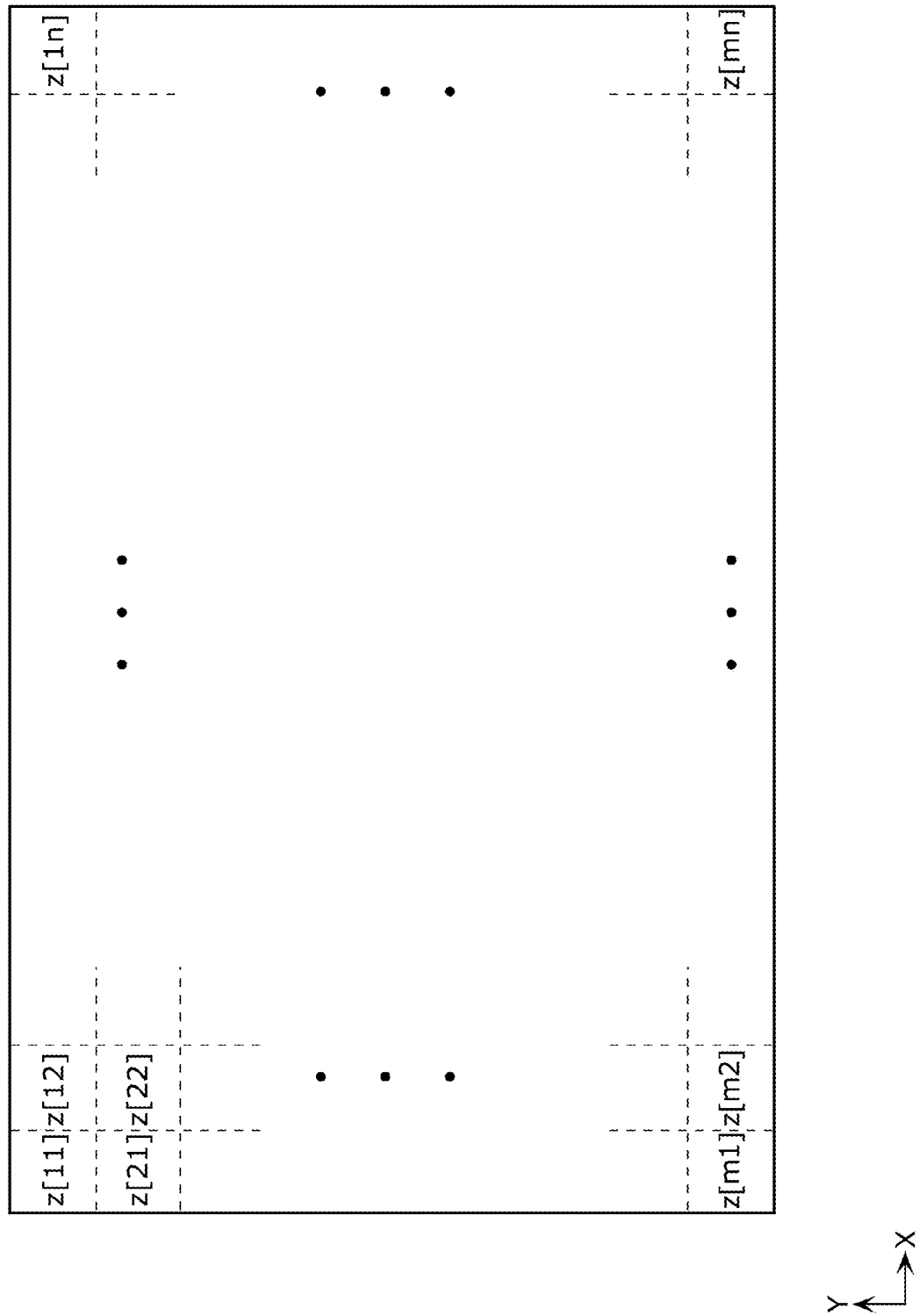
FIG. 3 illustrates a depth image.

FIG. 3 illustrates a depth image. The depth image is defined by a plurality of depth values. Each of the depth values corresponds to a pixel value of a plurality of pixels included in the depth image.

As shown in FIG. 3, the depth values included in the depth image are arranged in rows and columns.

For example, z[mn] indicates a depth value of a pixel corresponding to m-th row and n-th column in the depth image. Specifically, z[mn] indicates a depth value of a pixel at coordinates (n, m) in the depth image. Furthermore, for example, z[12] indicates a depth value of a pixel corresponding to 1st row and 2nd column in the depth image.

In the present embodiment, the depth value is represented in a range between −1 and 1, as an example.

It is to be noted that the depth value is not limited to be in the range between −1 and 1, and may be represented in a range between 0 and 255.

Figure 4:
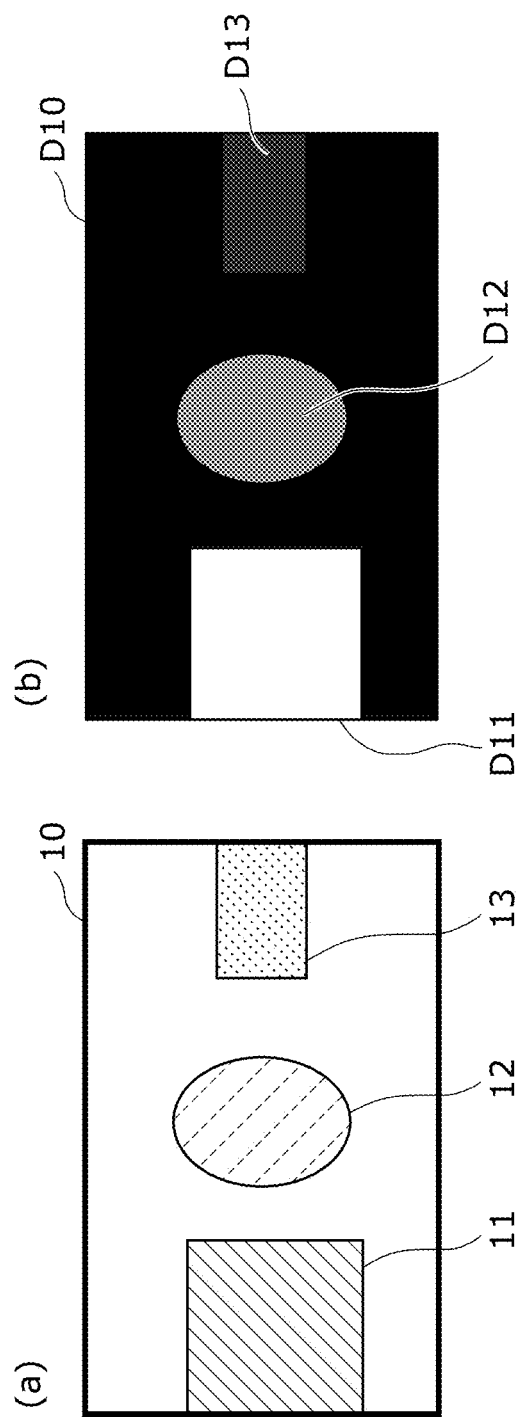
FIG. 4 illustrates a three-dimensional image.

FIG. 4 illustrates a three-dimensional image.

(a) in FIG. 4 shows a two-dimensional image 10 as an example. The two-dimensional image 10 is an image to be a processing target when a parallax image for depicting a three-dimensional image is generated. In the two-dimensional image 10 shown in (a) in FIG. 4, three objects are arranged which are an object 11, an object 12, and an object 13.

(b) in FIG. 4 shows a depth image D10 as an example. The depth image D10 is an image for generating, from the two-dimensional image 10 that is the processing target, two parallax images having mutual parallax. The two parallax images are the left-eye image 20L and the right-eye image 20R, or, a left-eye image 21L and a right-eye image 21R described later.

The size (resolution) of the two-dimensional image 10 is the same as the size (resolution) of the depth image D10. Hereinafter, each of the pixels included in the depth image is also referred to as a depth pixel. A depth pixel indicates a depth value. Specifically, the depth image is defined by a plurality of depth values.

The depth image D10 includes a plurality of depth pixels each indicating a depth value. Each of the depth pixels included in the depth image D10 indicates a depth value of a pixel which is in the two-dimensional image D10 and is at the same coordinates as the depth pixel. For example, a pixel at coordinates (x, y) in the depth image D10 indicates a depth value of a pixel at coordinates (x, y) in the two-dimensional image 10. Specifically, the two-dimensional image 10 is an image corresponding to the depth image D10. Furthermore, the pixel at the coordinates (x, y) in the two-dimensional image 10 is a pixel corresponding to the depth value having coordinates (x, y) in the depth image D10.

In the depth image D10, as an example, a pixel in the three-dimensional image corresponding to a depth pixel is more forward-positioned from the display screen 101 as the depth pixel looks closer to white. In the depth image D10, as an example, a pixel in the three-dimensional image corresponding to a depth pixel is more backward-positioned from the display screen 101 as the depth pixel looks closer to black.

The depth image D10 indicates a depth image D11, a depth image D12, and a depth image D13. Each of the pixels included in the depth image D11 indicates the depth value of each of the pixels included in the object 11. The same goes for the depth images D12 and D13.

A left-eye image and a right-eye image are generated from the two-dimensional image through a depth image based rendering (DIBR) method or the like using the depth image. Details are described later.

Figure 5:
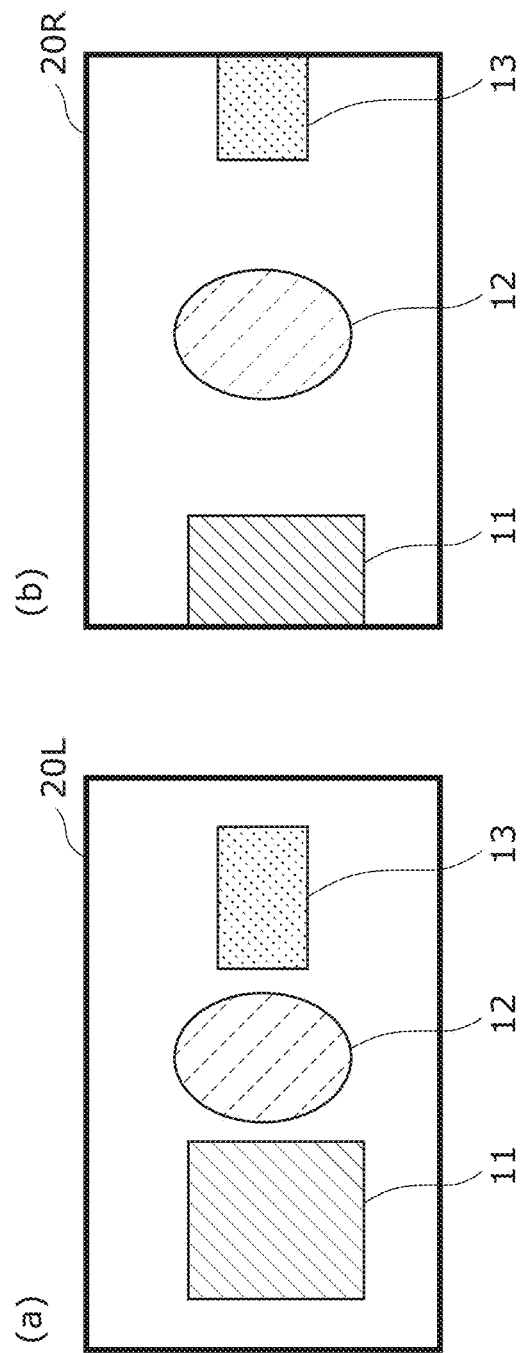
FIG. 5 shows a left-eye image and a right-eye image as an example.

FIG. 5 shows a left-eye image 20L and a right-eye image 20R as an example. The left-eye image 20L and the right-eye image 20R are images on which the processing according to the present invention has not been performed.

(a) in FIG. 5 shows the left-eye image 20L as an example. The left-eye image 20L includes the objects 11, 12, and 13 obtained by shifting each of the pixels in the two-dimensional image 10 according to the corresponding depth values.

(b) in FIG. 5 shows the left-eye image 20R as an example. The right-eye image 20R includes the objects 11, 12, and 13 obtained by shifting each of the pixels in the two-dimensional image 10 according to the corresponding depth values.

Here, it is assumed that the user views the left-eye image 20L with the left eye and the right-eye image 20R with the right eye, using the active shutter glasses 200 described above.

Figure 6:
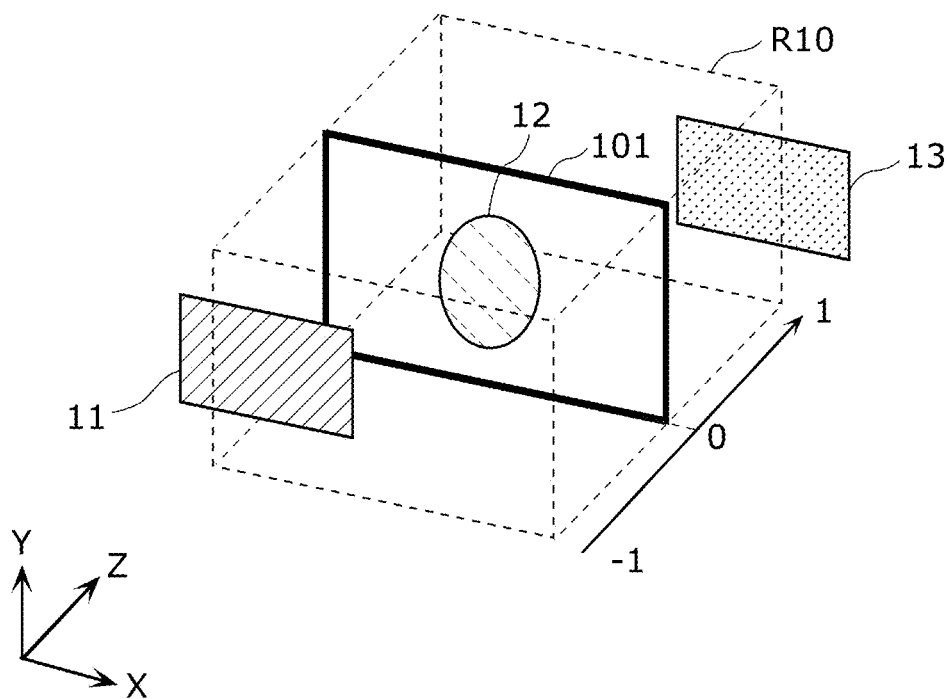
FIG. 6 shows an arrangement of an object in a three-dimensional area.

In this case, the user can feel a stereoscopic effect as if each of the objects 11, 12, and 13 were arranged in the position shown in FIG. 6 in a three-dimensional area R10 represented by a cuboid indicated with a broken line shown in FIG. 6. The three-dimensional area R10 is an area in which a three-dimensional image can be depicted for the user with a plurality of parallax images (left-eye image and right-eye image, for example). In this case, the user feels as if the stereoscopic effect of the object 11 were suddenly lost near a left end portion of the object 11 (specifically, a portion of the object 11 out of the three-dimensional area R10). Actually, the user feels like the portion of the object 11 out of the three-dimensional area R10 flashes.

In FIG. 6, a depth value is indicated in Z-axis direction of the three-dimensional area R10. Specifically, the depth value indicates a position for depicting each of the pixels in the three-dimensional image in the three-dimensional area R10 (three-dimensional space). The three-dimensional area R10 is represented by the depth value in a range between −1 and 1, as an example. Furthermore, the display screen 101 is a parallax-zero plane in FIG. 6. The parallax-zero plane is a plane in which parallax between (i) a pixel of a left-eye image displayed in a position and (ii) a pixel of a right-eye image displayed at the same position is zero. Hereinafter, a depth value corresponding to the parallax-zero plane is also refereed to as parallax-zero depth value.

In FIG. 6, the parallax-zero depth value of a position on the display screen 101 (parallax-zero plane) in Z-axis direction is represented by 0, as an example. It is to be noted that the depth value of the position on the parallax-zero plane may also be represented by a numerical value other than 0. Furthermore, in FIG. 6, a depth value in front of the display screen 101 in Z-axis direction is represented by a negative value, as an example. Furthermore, in FIG. 6, a depth value in back of the display screen 101 in Z-axis direction is represented by a positive value, as an example.

Figure 7:
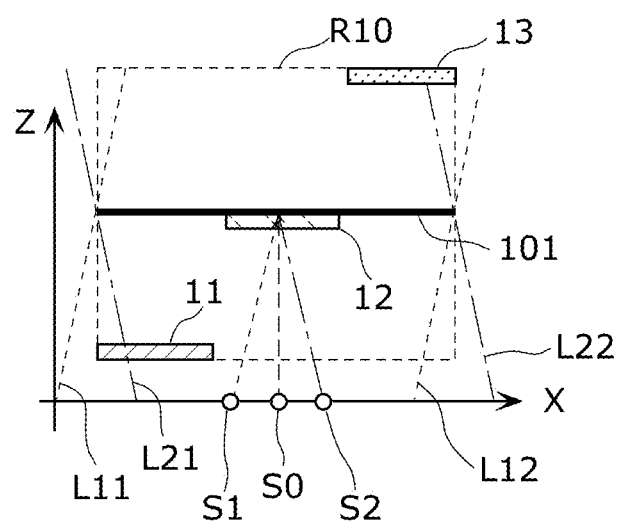
FIG. 7 shows an arrangement position of each object in the three-dimensional area viewed from ZX plane.

FIG. 7 shows the arrangement position of each of the objects in the three-dimensional area R10 viewed from ZX plane. FIG. 7 shows, as an example, arrangement relationship between each of the objects and each of the viewpoints when the left eye and the right eye of the user are arranged on X axis.

A viewpoint S0 is a position at which a position of a center of the display screen 101 (parallax-zero plane) is projected to the X axis. A viewpoint S1 corresponds to the position of the left eye of the user. A viewpoint S2 corresponds to the position of the right eye of the user.

An area between a line L11 and a line L12 out of the three-dimensional area R10 is an area including an image (left-eye image 20L, for example) depicted when the user views the display screen 101 from the viewpoint S1. Furthermore, an image displayed in an area between the line L21 and the line L22 out of the three-dimensional area R10 is an image (right-eye image 20R, for example) depicted when the user views the display screen 101 from the viewpoint S2.

Next, description is provided on processing for generating a parallax image (hereinafter refereed to as parallax image generation processing) according to the present embodiment. Here, it is assumed that the parallax image generation unit 120 obtains the two-dimensional image 10 that is the processing target. It is also assumed that the depth value correction unit 110 shown in FIG. 2 obtains the depth image D10 corresponding to the two-dimensional image 10.

Figure 8:
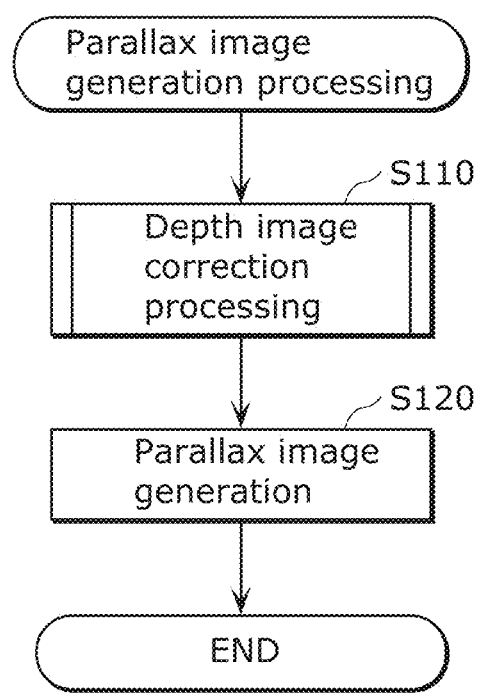
FIG. 8 is a flowchart of parallax image generation processing.

FIG. 8 is a flowchart of the parallax image generation processing. The parallax image generation processing corresponds to the parallax image generation method.

In S110, depth image correction processing is performed.

Figure 9:
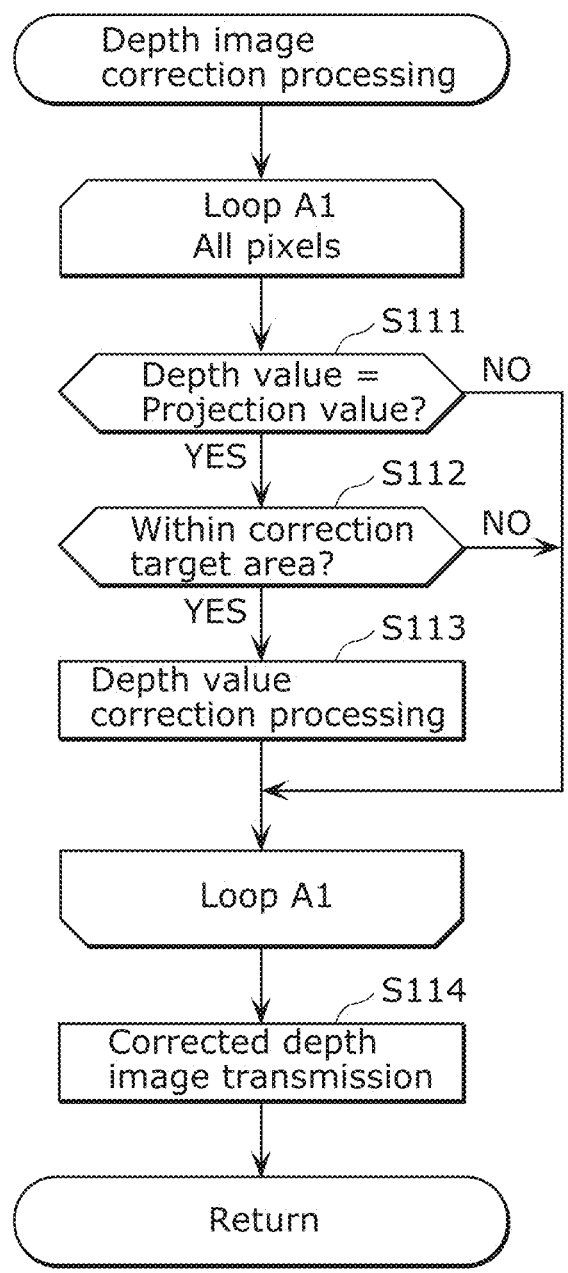
FIG. 9 is a flowchart of depth image correction processing.

FIG. 9 is a flowchart of the depth image correction processing.

In S111, the depth value correction unit 110 sets one of the pixels, which are included in the pixels included in the depth image that is the processing target, as a processing-target pixel (hereinafter also referred to as the processing-target depth pixel). Hereinafter, the depth value indicated by the processing-target depth pixel is also represented as a depth value z or z.

The depth value correction unit 110 then determines whether or not the depth value indicated by the processing-target depth pixel is a projection value. Here, the projection value is a value for depicting a pixel, which is in the three-dimensional image and is corresponding to the depth value indicated by the processing-target depth pixel, at a position in front of the parallax-zero plane.

Here, it is assumed that the parallax-zero depth value corresponding to the parallax-zero plane is 0, as an example. Furthermore, the depth value is represented within a range between −1 and 1. In this case, the projection value is within a range from −1≤projection value<0.

When the result shows YES in S111, the processing proceeds to S112. Meanwhile, when the result shows NO in S111, the processing on the current processing-target depth pixel is ended. In the processing of S111, a different pixel is set as the processing-target depth pixel every time.

In S112, the depth value correction unit 110 determines whether or not the processing-target depth pixel is a pixel in the correction target area. The correction target area is an area in the depth image.

Figure 10:
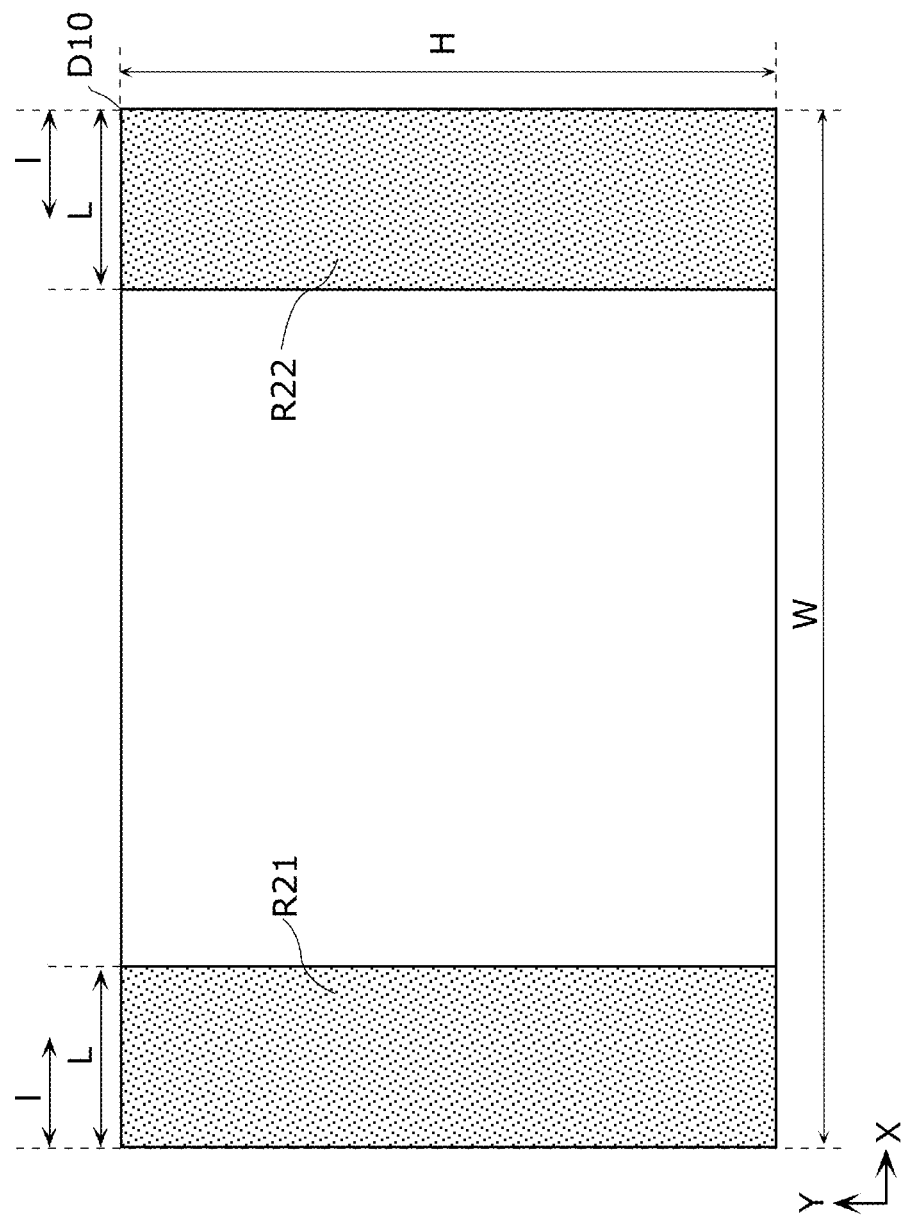
FIG. 10 illustrates a correction target area in the depth image.

FIG. 10 illustrates a correction target area in the depth image.

It is assumed that the depth image shown in FIG. 10 is, as an example, the depth image D10. It is to be noted that the image indicated by the depth image D10 is not shown in FIG. 10 to simplify the drawing.

A width L for the correction target area is calculated by multiplying the width W of the depth image by a predetermined coefficient k (0<k<1), by the depth value correction unit 110. It is assumed that k is, for example, 0.1 (or 0.05). When the width of the depth image is 1920 pixels for example, the L is 192 pixels (96 pixels).

It is to be noted that the width L for the correction target area is not limited to be calculated in the above manner and may be calculated by multiplying the width of the two-dimensional image that is the processing target by a coefficient k, by the depth value correction unit 110. Here, the width of the two-dimensional image that is the processing target is equal to a width W of the depth image that is the processing target. Specifically, the depth value correction unit 110 calculates the value of the L based on the horizontal size of the two-dimensional image or the depth image. More specifically, the depth value correction unit 110 increases a value of the L as the two-dimensional image has a larger horizontal size.

A correction target area R21 and a correction target are R22 are arranged in the depth image. The correction target area R21 is an area separated from the left end of the depth image by a distance L out of the depth image. Here, it is assumed that the distance L is equal to the width of L (integer greater than or equal to 1) pixels arranged continuously in X direction.

Specifically, the correction target area R21 is an area separated from the left end of the depth image by up to L pixels out of the depth image.

The correction target area R22 is an area separated from the right end of the depth image by a distance L out of the depth image. Specifically, the correction target area R22 is an area separated from the right end of the depth image by up to L pixels out of the depth image.

Specifically, the correction target areas R21 and R22 each is, out of the depth image, an area departed from the left end or right end of the depth image by up to L (integer greater than or equal to 1) pixels.

Specifically, the correction target areas R21 and R22 are determined based on the horizontal size of the two-dimensional image or the depth image. As an example, the correction target areas R21 and R22 can each be defined as a width equivalent to approximately 5% of the horizontal size of the two-dimensional image. However, the method for defining the correction target areas R21 and R22 is not limited to the above and a method described below may be used, for example.

As an example, the correction target areas R21 and R22 each may be a predetermined area. Specifically, L may be a predetermined value.

As another example, a value of L may be determined according to a value of the depth values included in the correction target areas R21 and R22. More specifically, the depth value correction unit 110 extracts, from among the depth values included in the correction target area, a depth value whose corresponding position is most separated from the display screen in front of the display screen (a value closest to −1, in the above example). The depth value correction unit 110 may then increase a value of the L as the position corresponding to the extracted depth value is separated from the display screen in front of the display screen (specifically, as the extracted depth value is closer to −1).

Furthermore, although the correction target areas R21 and R22 are set in the right and left ends of the depth image in the example in FIG. 10, instead of or in addition to the above, the correction target area may be set in the upper and lower ends of the depth image. Specifically, it is sufficient that the correction target area is set at least in one of the right-and-left ends of the depth image and the upper-and-lower ends of the depth image.

The depth value correction unit 110 may change a width (specifically, value of L) of the right-and-left correction target areas and the upper-and-lower correction target areas of the depth image based on characteristics of the corresponding two-dimensional image (capturing conditions of the two-dimensional image, as an example). For example, when the imaging device is panned (facing direction of imaging device is moved in right-and-left direction) or tilted (facing direction of imaging device is moved in upper-and-lower direction) during capturing a two-dimensional image, the depth value correction unit 110 changes the width of the correction target area of the corresponding depth image.

As an example, when the two-dimensional image is an image captured while an imaging device is being panned, the depth value correction unit 110 compares the two-dimensional image with an image captured while the imaging device is not being panned, and expands the width of the correction target area in the right end and the left end of the depth image (increases a value of the L). In the same manner, when the two-dimensional image is an image captured while an imaging device is being tilted, the depth value correction unit 110 compares the two-dimensional image with an image captured while the imaging device is not being tilted, and expands the width of the correction target area in the upper end and the lower end of the depth image (increases a value of the L).

As another example, the depth value correction unit 110 may change the width of the correction target area according to the speed (scrolling speed) of panning or tilting. Specifically, the depth value correction unit 110 expands the width of the correction target area in the right end and the left end of the depth image as the imaging device is being panned faster. In the same manner, the depth value correction unit 110 expands the width of the correction target area in the right end and the left end of the depth image as the imaging device is being tilted faster.

As a yet another example, the depth value correction unit 110 may set the width of the correction target area in the right-and-left ends (or upper-and-lower ends) of the depth image asymmetry, according to a direction in which the imaging device faces (direction of panning or tilting). Specifically, the depth value correction unit 110 expands the correction target area in a direction in which the imaging device faces (a side from which the object comes in t the frame) to be larger than the correction target area on the other side (a side to which the object goes out of the frame).

Specifically, when the imaging device is panned in the right (left) direction, the depth value correction unit 110 expands the correction target area in the right (left) end of the depth image to be larger than the correction target area in the left (right) end of the correction target area. In the same manner, when the imaging device is tilted in the upper (lower) direction, the depth value correction unit 110 expands the correction target area in the upper (lower) end of the depth image to be larger than the correction target area in the lower (upper) end of the correction target area.

It is to be noted that the parallax image generation device 100 may obtain the above capturing conditions (pan/tilt, direction of movement of the imaging device (right-and-left and up-and-low)) along with the two-dimensional image and the depth image from outside of the device, or may estimate the conditions from an amount of movement which can be calculated by comparing a plurality of two-dimensional images each captured at a plurality of time points.

With reference to FIG. 9 again, in S112, the processing proceeds to S113 when the result shows YES. Meanwhile, when the result shows NO in S112, the processing on the current processing-target depth pixel is ended.

The depth value indicated by the processing-target depth pixel determined as YES in S111 and S112 is a depth value for depicting a part of pixels of the three-dimensional image in front of the display screen 101.

In S113, depth image correction processing is performed. In the depth value correction processing, the depth value correction unit 110 performs correction processing on a depth value, from among the depth values which define the depth image, to shift a position corresponding to the depth value to be closer to a display screen 101 as the depth value is located closer to an end of the depth image, the display screen 101 being for displaying a parallax image.

More specifically, the depth value correction unit 110 corrects each of the depth values included in the correction target area R21 shown in FIG. 10 to shift the depth value located closer to the left end of the depth image D10 to be closer to 0 gradually. In the same manner, the depth value correction unit 110 corrects each of the depth values included in the correction target area R22 shown in FIG. 10, to shift the depth value located closer to the right end of the depth image D10 to be closer to 0 gradually.

It is to be noted that "a position corresponding to the depth value" is a position in Z axis direction designated (indicated) by the depth value in the three-dimensional area R10 (three-dimensional space). In other words, the position corresponding to the depth value is a position designated (indicated) by the depth value on an axis orthogonal to the display screen 101.

Hereinafter, the depth value after the correction is represented as a corrected depth value z'.

Figure 11:
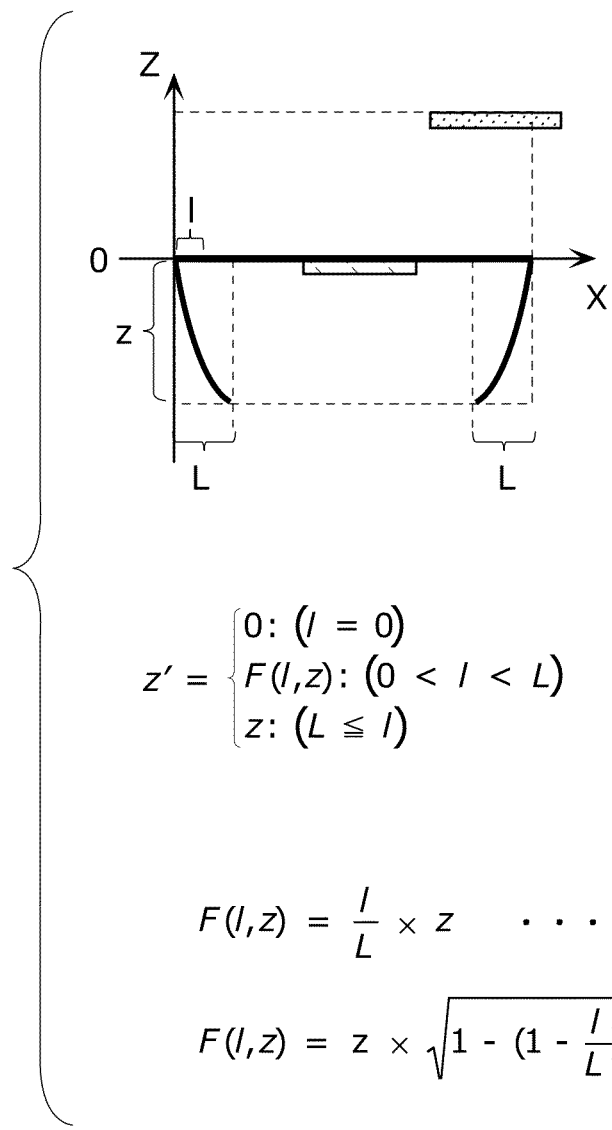
FIG. 11 shows a state of the depth value after correction.

Specifically, the depth value correction unit 110 calculates the corrected depth value z' by Equation 1 and Equation 2 shown in FIG. 11.

[Math 1]

$$z' = \begin{cases} 0 : (l = 0) \\ F(l, z) : (0 < l < L) \\ z : (L \leq l) \end{cases} \qquad \text{Equation 1}$$

[Math 2]

$$F(l, z) = \frac{l}{L} \times z \qquad \text{Equation 2}$$

In FIG. 11, l in Equation 1 and Equation 2 is a distance (the number of pixels) from an end of the depth image to the processing-target depth pixel. When the processing-target depth pixel is a pixel within the correction target area R21, l is a distance from the left end to the processing-target depth pixel of the depth image. In this case, if 0<l<L is satisfied, the corrected depth value z' is calculated by Equation 2. For example, it is assumed that L=200 and l=20. It is also assumed that z at the position where l=20 is −1. In this case, z=−0.1 is obtained by Equation 2.

Meanwhile, when the processing-target depth pixel is a pixel within the correction target area R22, l is a distance from the right end to the processing-target depth pixel of the depth image. In this case, if 0<l<L is satisfied, the corrected depth value z' is calculated by Equation 2.

It is to be noted that when l=0, the corrected depth value z' is 0.

Specifically, through the depth value correction processing using Equation 1 and Equation 2, the depth value correction unit 110 corrects, from among the depth values which define the depth image, a depth value located closest to the end of the depth image to be a value for depicting a pixel in the display screen 101 (parallax-zero plane).

It is to be noted that when l=0, the corrected depth value z' may be a predetermined value other than 0. The predetermined value is a value which the absolute value is close to 0.

It is to be noted that the processing of S112 does not have to be performed. In this case, if L≤l is satisfied, the result of the calculation by Equation 1 shows that the corrected depth value z' is a value of the depth value z indicated by the processing-target depth pixel.

Furthermore, the equation for calculating the corrected depth value z' is not limited to Equation 2. Specifically, another equation may be used as long as the equation is for calculating the corrected depth value z' in such a manner that a position corresponding to a depth value is closer to the display screen 101 as the depth value is located closer to the end of the depth image. The corrected depth value z' may be calculated by Equation 3 below, for example.

[Math 3]

$$F(l, z) = z \times \sqrt{1 - \left(1 - \frac{1}{L}\right)^2}$$

Equation 3

The processing of S111 through S113 is performed on all of the pixels included in the depth image. It is to be noted that the processing of S112 is performed only when the result of S111 shows YES. Furthermore, the processing of S113 is performed only when the result of S112 shows YES.

Thus, a depth image is generated in which at least a part of the depth values, which are included in each of the correction target areas R21 and R22 in the depth image, is corrected (hereinafter also referred to as a corrected depth image).

FIG. 11 shows a state of depth values after correction. FIG. 11 shows, as an example, a state of the depth value after correction in a case where the depth value that is the processing target in S113 is present in each of the correction target areas R21 and R22. In this case, the depth values after the correction are values corresponding to a curve corresponding to each of two Ls in the graph shown in FIG. 11.

In a case where the depth value that is the processing target in S113 is present only in the correction target area R21, the depth value is a value corresponding to the curve corresponding to the L shown in the left of the graph shown in FIG. 11.

Figure 12:
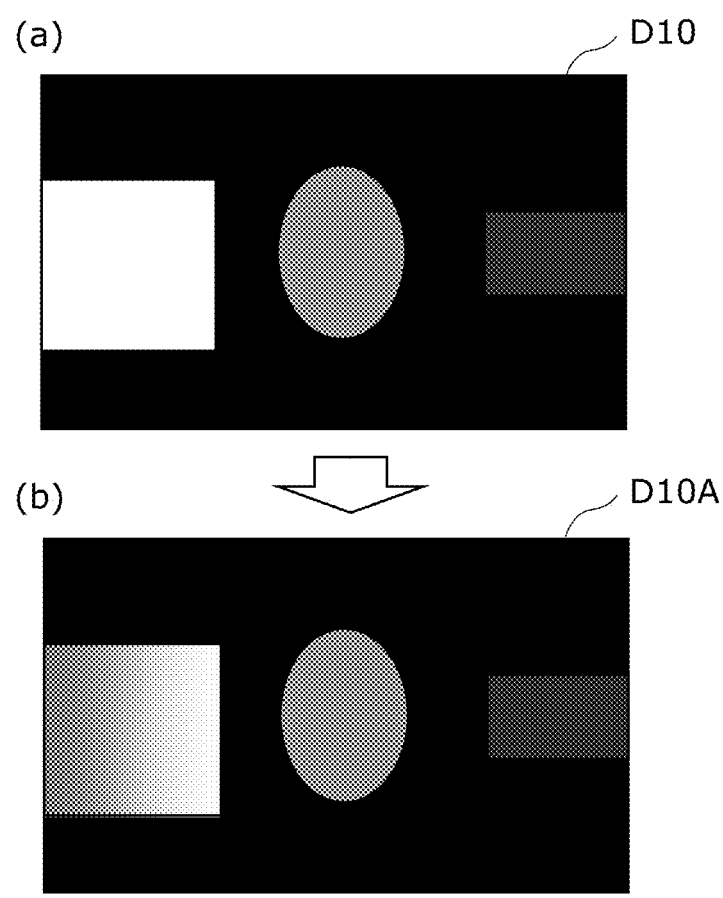
FIG. 12 shows a depth image as an example.

FIG. 12 shows a depth image as an example.

(a) in FIG. 12 shows the depth image D10. Here, when the depth image that is the processing target of the depth image correction processing is the depth image D10, the corrected depth image generated through the depth image correction processing is the corrected depth image D10A shown in (b) in FIG. 12.

Through the depth value correction processing in S113 on the processing-target depth pixels determined as YES in S112, the depth value correction unit 110 performs the correction processing (depth value correction processing) on, from among the depth values corresponding to the correction target area, a depth value which is for depicting a part of pixels of the three-dimensional image in front of the display screen 101.

After the above processing is performed on all of the pixels included in the depth image, the processing of S114 is performed.

In S114, the depth value correction unit 110 transmits the corrected depth image D10A to the parallax image generation unit 120.

Then, the depth image correction processing is ended, the processing returns to the parallax image generation processing in FIG. 8 again, and transits to S120.

In S120, a parallax image is generated. Specifically, the parallax image generation unit 120 generates a first parallax image and a second parallax image having mutual parallax, using the two-dimensional image 10 that is the processing target and the corrected depth image D10A corrected through the correction processing (depth image correction processing). The first parallax image and the second parallax image are images necessary for depicting a three-dimensional image. The first parallax image is a left-eye image and the second parallax image is a right-eye image. A left-eye image and a right-eye image are generated from a single two-dimensional image through, for example, DIBR method or the like using a depth image. It is to be noted that the DIBR method is a publicly known technique and thus detailed description is not provided.

Below is description on the above. The following processing is performed by the parallax image generation unit 120. Here, it is assumed that the two-dimensional image that is the processing target is a two-dimensional image 10. Here, to simplify the description, it is assumed that the depth value is represented by a value in a range from 0 to 255, as an example.

Figure 13:
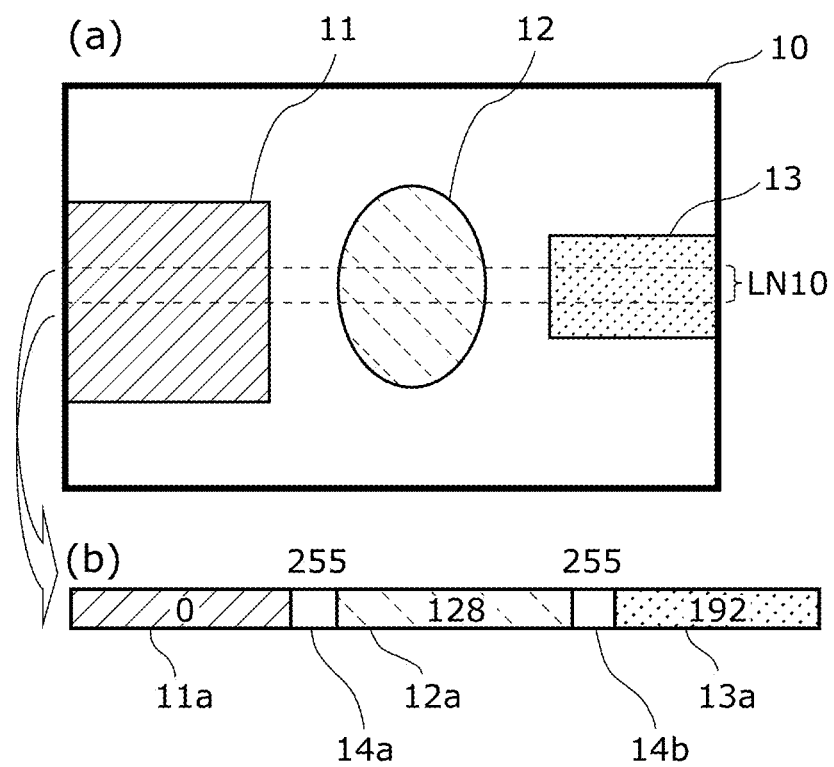
FIG. 13 illustrates a single line in a two-dimensional image that is a processing target.

FIG. 13 illustrates one line in the two-dimensional image 10 that is the processing target.

(a) in FIG. 13 shows a processing-target line LN10 in the two-dimensional image 10. The processing-target line LN10 is one line which is a processing target in the two-dimensional image 10.

(b) in FIG. 13 indicates depth values of a plurality of pixels included in the processing-target line LN10. Numerical values shown in (b) in FIG. 13 are each a depth value corresponding to each area (pixel group). It is to be noted that the depth values shown in (b) in FIG. 13 are an example, and are not the depth values corresponding to the corrected depth image D10A.

A pixel group 11a is, out of the object 11, a pixel group included in an area corresponding to the processing-target line LN10. A pixel group 12a is, out of the object 12, a pixel group included in an area corresponding to the processing-target line LN10. A pixel group 13a is, out of the object 13, a pixel group included in an area corresponding to the processing-target line LN10. Each of a pixel group 14a and pixel group 14b is, out of an area other than the objects 11, 12, and 13, a pixel group included in an area corresponding to the processing-target line LN10.

As shown in (b) in FIG. 13, the depth value of each of the pixels included in the pixel group 11a is 0. The depth value of each of the pixels included in the pixel group 12a is 128. The depth value of each of the pixels included in the pixel group 13a is 192. The depth value of each of the pixels included in each of the pixel groups 14a and 14b is 255.

Figure 14:
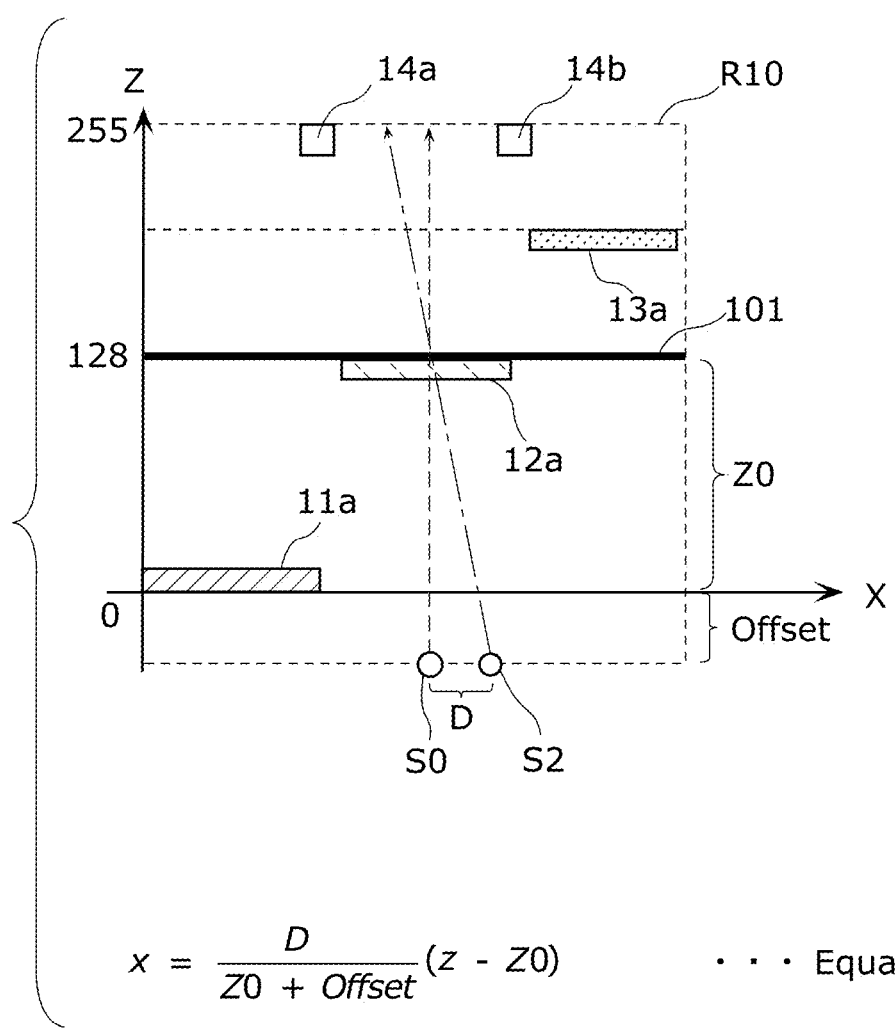
FIG. 14 shows an arrangement state of a pixel group in the three-dimensional area.

FIG. 14 shows an arrangement state of the pixel groups in the three-dimensional area R10. In FIG. 14, Offset represents a predetermined offset value (viewing distance Offset). It is to be noted that Offset may be 0. Furthermore, in FIG. 14, a distance D is a distance between the viewpoint S0 and the viewpoint 1.

A zero-parallax distance Z0 is a distance between X axis and the display screen 101, on a straight line which passes the viewpoint S0 and the display screen 101. The zero parallax distance Z0 is 128, as an example.

In this case, a shift amount (movement amount) x of each of the pixels included in the processing-target line LN10 is calculated by the parallax image generation unit 120 using the following Equation 4.

[Math 4]

$$x = \frac{D}{Z0 + \text{Offset}}(z - Z0)$$

Equation 4

Figure 15:
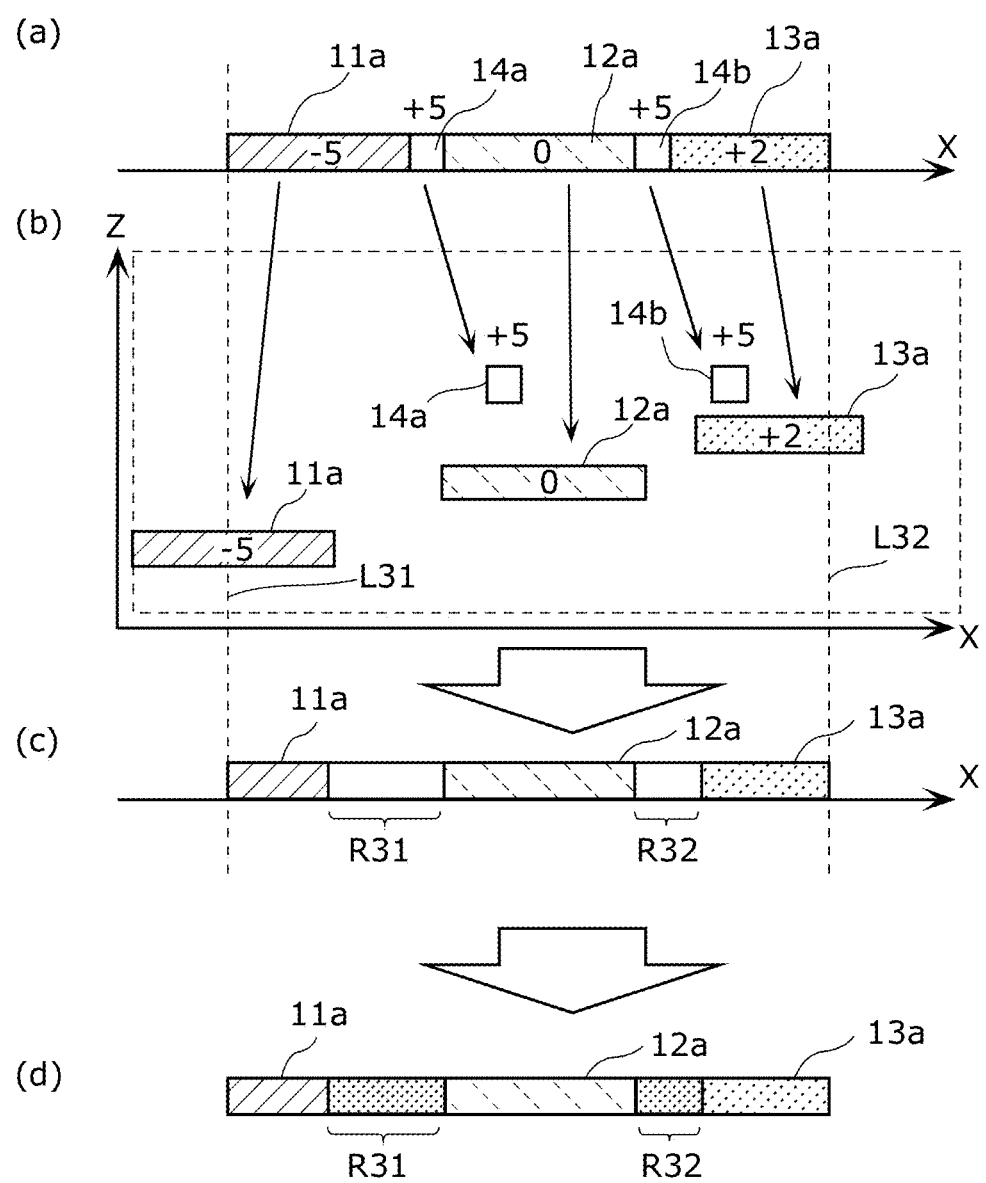
FIG. 15 illustrates shift of pixels.

FIG. 15 illustrates shift of pixels.

(a) in FIG. 15 indicates an example of the shift amount of the pixel group calculated by Equation 4.

As shown in (a) in FIG. 15, the shift amount of each of the pixels included in the pixel group 11a is −5. The shift amount of each of the pixels included in the pixel group 12a is 0. The shift amount of each of the pixels included in the pixel group 13a is +2. The shift amount of each of the pixels included in each of the pixel groups 14a and 14b is +5.

Each of the pixels included in the processing-target line LN10 is shifted in X-axis direction as shown in (b) in FIG. 15, based on the corresponding shift amount.

As shown in (b) in FIG. 15, each of the pixels included in the pixel group 11a is shifted to the left by five pixels. Each of the pixels included in the pixel group 12a is not shifted. Each of the pixels included in the pixel group 13a is shifted to the right by two pixels. Each of the pixels included in each of the pixel groups 14a and 14b is shifted to the right by five pixels.

Then, out of each of the pixels present in an area between a straight line L31 and a straight line L32 in (b) in FIG. 15, pixels close to X axis (pixels indicating depth values) are defined as new pixels for the processing-target line LN10. Specifically, in (b) in FIG. 15, each of the pixels included in the pixel groups 14a and 14b are not used as pixels included in the processing-target line LN10.

Thus, as shown in (c) in FIG. 15, each of the pixels included in the processing-target line LN10 is updated. Specifically, the processing-target line LN10 is updated. It is to be noted that in the updated processing-target line LN10, a blank area R31 and a blank area R32 may occur in which no pixel is present.

In this case, for example, a linear interpolation processing is performed, to make a depth value of a pixel adjacent to the left end of the blank area R31 smoothly connected with a depth value of a pixel adjacent to the right end of the blank area R31. In the same manner, the linear interpolation processing is also performed on the blank area R32. Thus, the new pixels included in the processing-target line LN10 are as shown in (d) in FIG. 15.

It is to be noted that the processing for interpolating a pixel in the blank area is not limited to the linear interpolation processing and may be another processing.

The above-described processing on the processing-target line LN10 is performed on all of the lines (rows) included in the two-dimensional image 10. Thus, the right-eye image as the second parallax image is generated from the two-dimensional image 10. It is to be noted that the method of generating the left-eye image as the first parallax image is similar to the above method of generating the right-eye image, and therefore the detailed description is not repeated.

In S120, the parallax image generation unit 120 generates a left-eye image and a right-eye image having mutual parallax, using the two-dimensional image 10 that is the processing target and the corrected depth image D10A corrected through the correction processing (depth image correction processing), through processing similar to the above method of generating the right-eye image with reference to FIG. 13 to FIG. 15. The depth value of each of the pixels included in the two-dimensional image 10 is the depth value of the pixel in the corrected depth image D10A corresponding to the pixel.

Hereinafter, the left-eye image and the right-eye image generated using the two-dimensional image that is the processing target and the corrected depth image corrected through the depth image correction processing are called the corrected left-eye image and the corrected right-eye image in this order.

Figure 16:
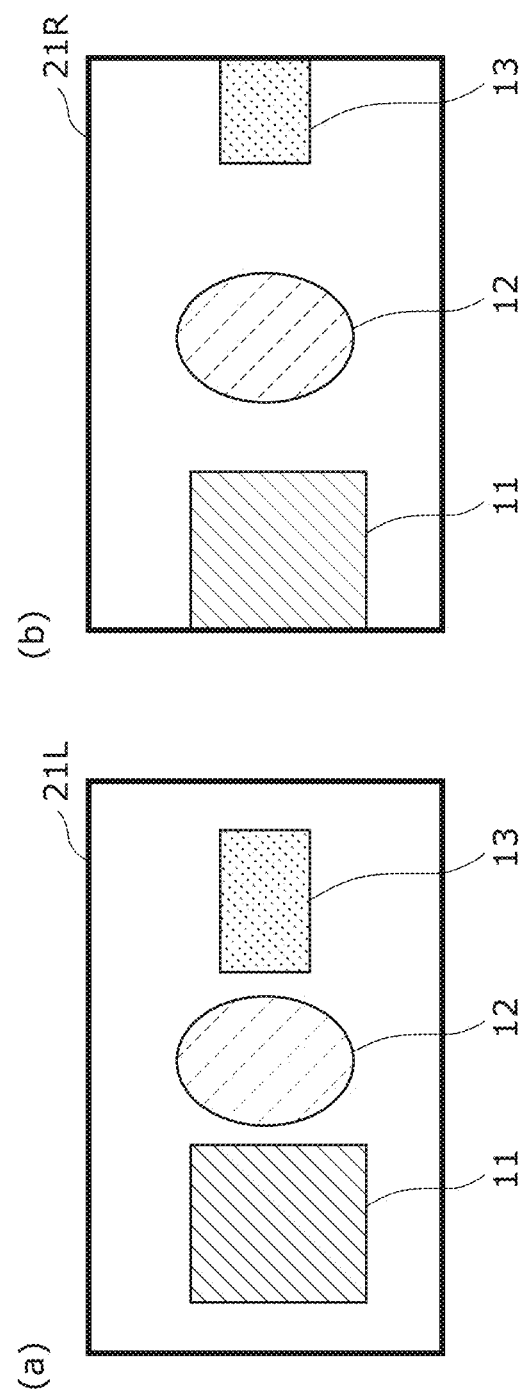
FIG. 16 shows a left-eye image and a right-eye image generated through parallax image generation processing according to Embodiment 1 of the present invention.

FIG. 16 shows a left-eye image 21L and a right-eye image 21R generated through parallax image generation processing according to Embodiment 1 of the present invention. The left-eye image 21L is a corrected left-eye image. The right-eye image 21R is a corrected right-eye image.

(a) in FIG. 16 shows the left-eye image 21L as an example. (b) in FIG. 16 shows the right-eye image 21R as an example. Each of the left-eye image 21L and the right-eye image 21R is an image generated from the two-dimensional image 10 that is the processing target using the corrected depth image D10A, through processing of S120. It is to be noted that the position of the object indicated by each of the left-eye image 21L and the right-eye image 21R shown in FIG. 16 is not necessarily correct.

It is to be noted that the parallax image generation device 100 alternately displays the generated left-eye image 21L and the generated right-eye image 21R on the display screen 101. Specifically, the display screen 101 displays the generated first parallax image (left-eye image 21L) and the generated second parallax image (right-eye image 21R).

Figure 17:
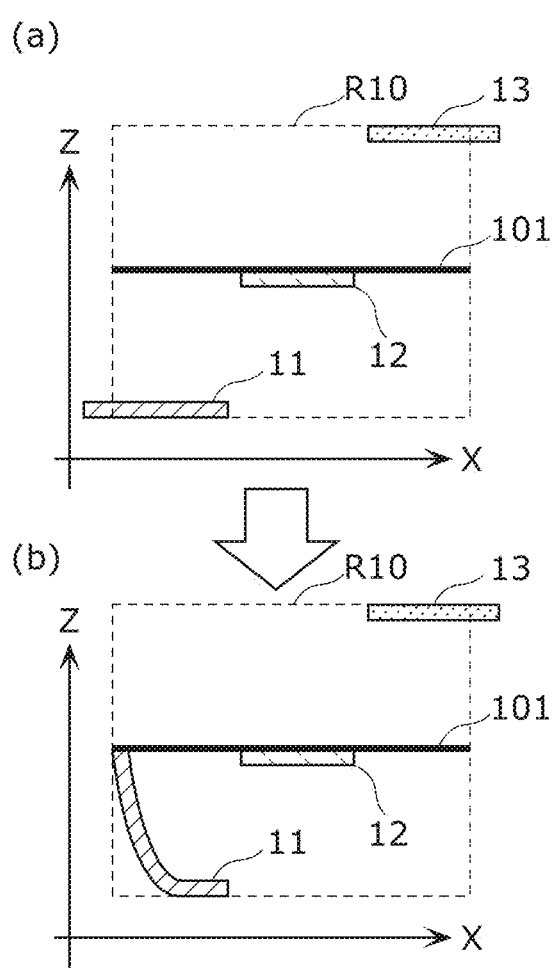
FIG. 17 shows an arrangement state of each object in the three-dimensional area.

FIG. 17 shows an arrangement state of each of the objects in the three-dimensional area R10. (a) in FIG. 17 shows a position of an object depicted by the left-eye image 20L and the right-eye image 20R on which the processing according to the present invention has not been performed, in the three-dimensional area R10. When a user views the left-eye image 20L and the right-eye image 20R using the active shutter glasses 200 in a state in (a) in FIG. 17, the user feels that the stereoscopic effect of the object 11 is suddenly lost near the left end of the object 11.

(b) in FIG. 17 shows a position of an object depicted by the left-eye image 21L and the right-eye image 21R in the three-dimensional area R10.

Specifically, (b) in FIG. 17 shows a position and shape of the object depicted in the three-dimensional area R10 to the user who views the left-eye image 21L with the left eye and the right-eye image 21R with the right eye using the above-described active shutter glasses 200.

Figure 18:
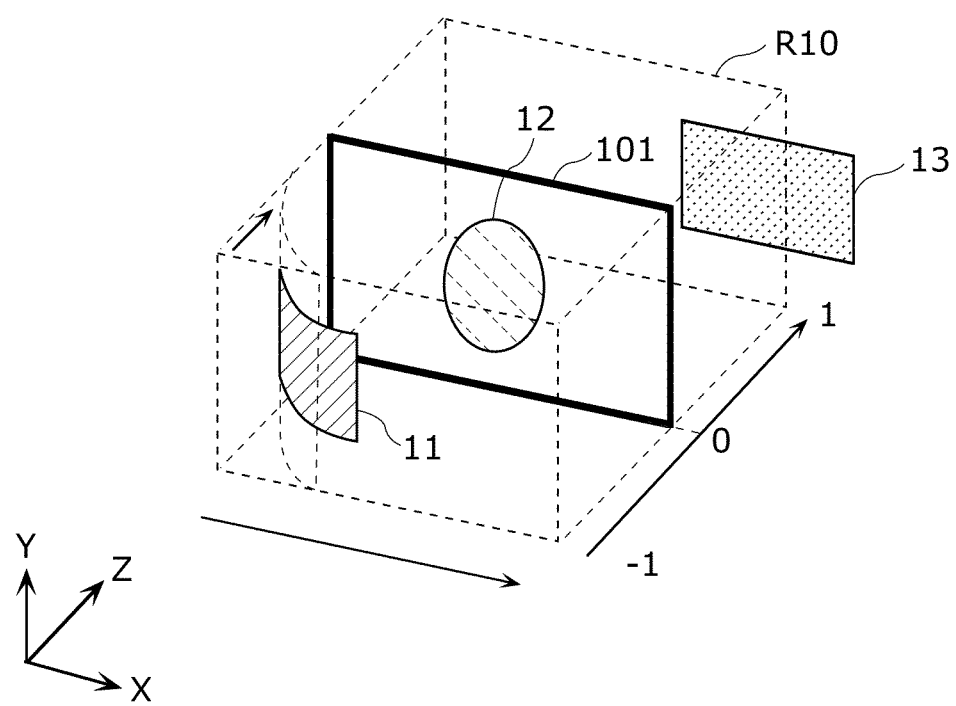
FIG. 18 is a perspective view which shows a position of an object depicted by the left-eye image and the right-eye image in the three-dimensional area.

FIG. 18 is a perspective view which shows a position of an object depicted by the left-eye image 21L and the right-eye image 21R in the three-dimensional area R10. Specifically, FIG. 18 shows the position and the shape of each of the objects shown in (b) in FIG. 17.

As shown in (b) in FIG. 17 and FIG. 18, the depth value of the pixel in the left end of the object 11 is 0. Therefore, the projecting amount of the pixel located closer to the left end of the object 11 is closer to 0.

However, the size of the three-dimensional image depicted by the left-eye image 21L and the right-eye image 21R generated through the parallax image generation processing according to the present embodiment does not decrease as in the conventional technique A. Furthermore, with the three-dimensional image depicted by the left-eye image 21L and the right-eye image 21R, unnatural depiction can be prevented including the sudden loss of the stereoscopic effect of the object 11 near the left end of the object 11 as shown in (a) in FIG. 17.

Accordingly, with the present invention, unnatural depiction in an end portion of a three-dimensional image can be reduced without decreasing the size of the three-dimensional image.

Although in the present embodiment the depth value correction processing is performed only on the processing-target depth pixel which indicates a projection value and is included in one of the correction target areas R21 and R22, the target of the processing is not limited to the above.

For example, in FIG. 9, processing of S111 may not have to be performed. In this case, for example, the depth value correction processing may be performed on the processing-target depth pixel which does not indicate a projection value and is included in one of the correction target areas R21 and R22. Specifically, the depth value correction processing may be performed on the processing-target depth pixel which indicates the depth value for depicting the pixel in back of the display screen 101 and is included in one of the correction target areas R21 and R22.

In this case, the depth value correction unit 110 performs the correction processing (depth value correction processing) on a plurality of depth values corresponding to one of the correction target areas R21 and R22. With this processing, in the three-dimensional area R10 in FIG. 18, the right end of the object 13 can be depicted at a position in the right end of the display screen 101. Specifically, it is possible to prevent the phenomena that the depth of the right end of the object 13 that is in back of the display screen 101 is lost suddenly near the right end portion of the object 13.

Although it is described that the parallax-zero depth value corresponding to the parallax-zero plane is a predetermined value, the parallax-zero depth value is not limited to the above. The parallax-zero depth value may be changed as appropriate according to, for example, a parallax parameter given from outside of the parallax image generation device 100.

Furthermore, although it is described in the present embodiment that the depth image is an image preliminarily prepared, the depth image is not limited to the above. The depth image may be generated from a parallax amount between the left-eye image and the right-eye image obtained through imaging processing performed by a 3D camera.

As described above, the parallax image generation device 100 is a display.

Figure 19:
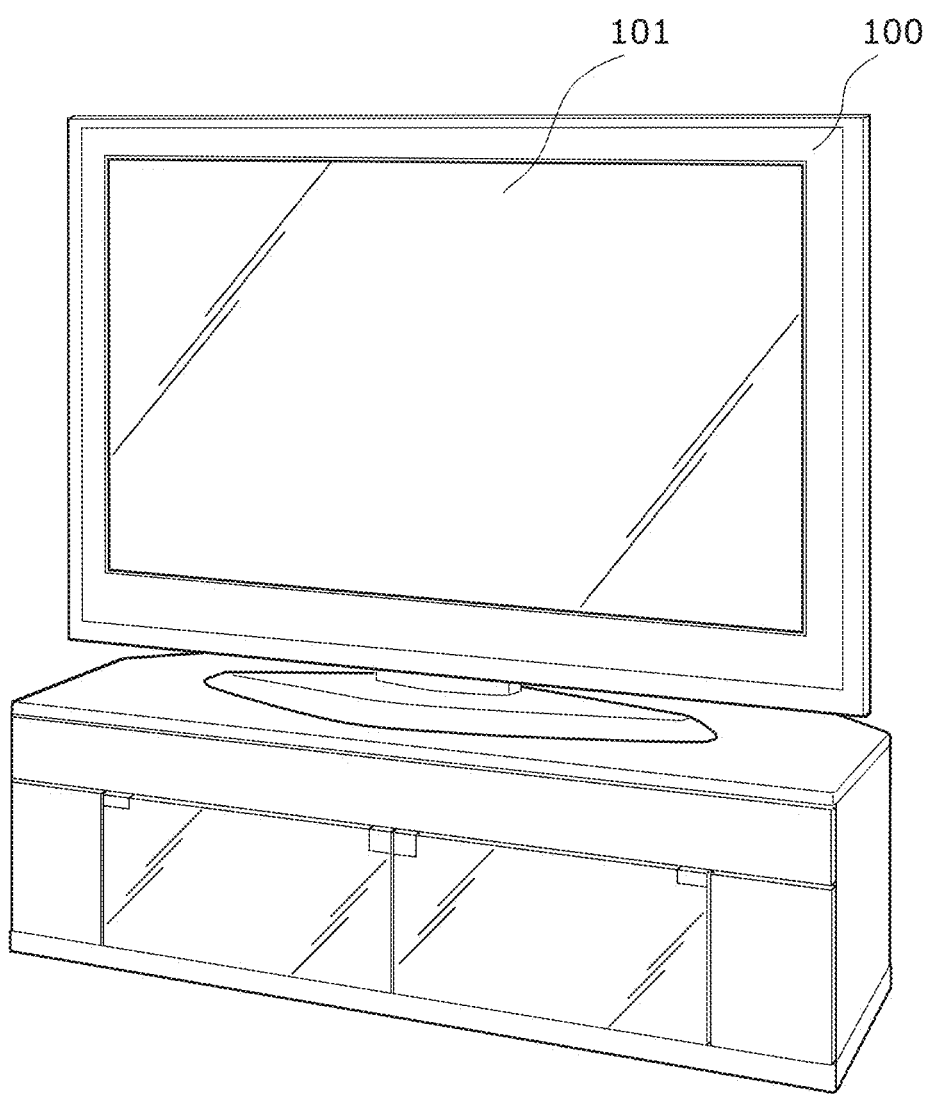
FIG. 19 is an external view of the parallax image generation device as a display.

FIG. 19 is an external view of the parallax image generation device 100 as a display.

As described above, the parallax image generation device 100 is not limited to the above display but may be a digital video camera, a digital still camera, or the like.

Figure 20A:
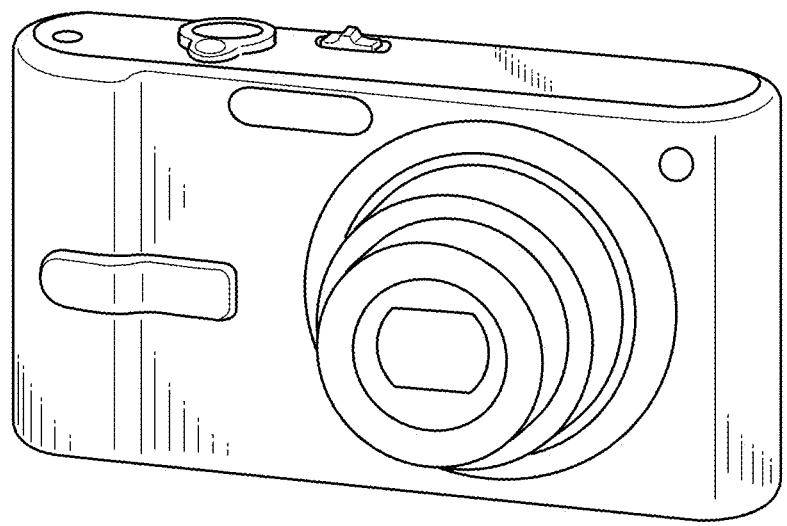
FIG. 20A is an external view of the parallax image generation device as a digital still camera.
Figure 20B:
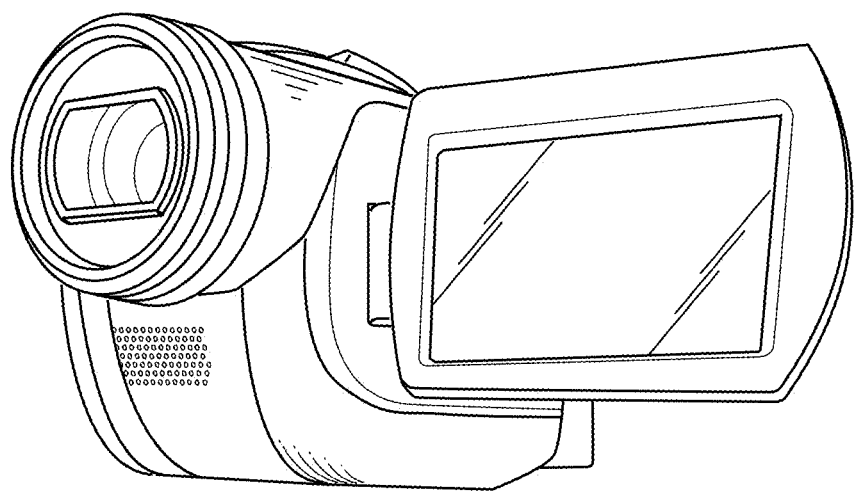
FIG. 20B is an external view of the parallax image generation device as a digital video camera.

FIG. 20A is an external view of the parallax image generation device 100 as a digital still camera. FIG. 20B is an external view of the parallax image generation device 100 as a digital video camera.

Embodiment 2

The present invention may be implemented as a parallax image generation method including the operation of the characteristic constituents included in the parallax image generation device 100 as steps. Furthermore, the present invention may be implemented as a program which causes a computer to execute each of the steps included in such a parallax image generation method. Furthermore, the present invention may be implemented as a computer-readable recording medium on which such a program is stored.

Specifically, it is possible to easily implement the processing indicated in the above embodiment on an independent computer system, by recording the program for implementing the parallax image generation method on a recording medium such as a flexible disk or the like.

Figure 21A:
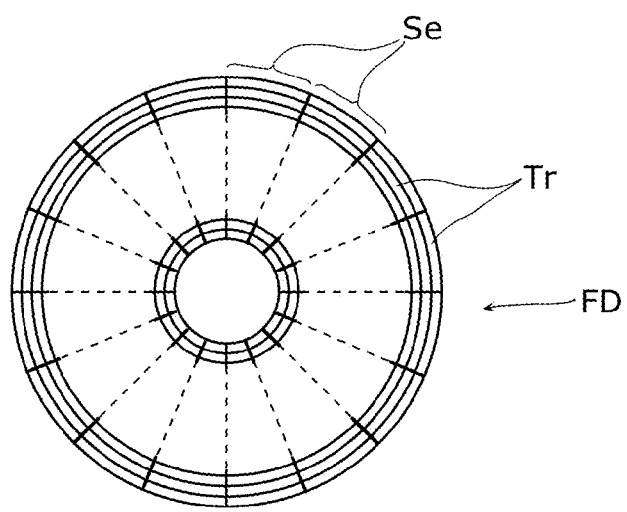
FIG. 21A shows an example of a physical format of a recording medium according to Embodiment 2 of the present invention.
Figure 21B:
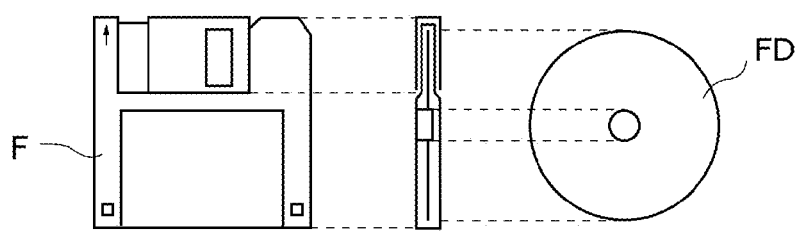
FIG. 21B shows a configuration of the recording medium according to Embodiment 2 of the present invention.
Figure 21C:
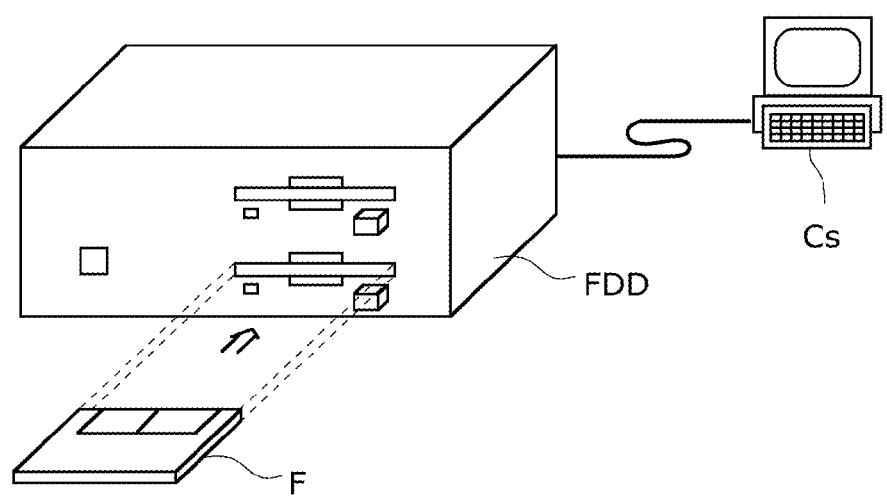
FIG. 21C shows a configuration of a computer system according to Embodiment 2 of the present invention.

FIG. 21A to FIG. 21C each illustrates a case where the parallax image generation method described in the above embodiment is implemented by a computer system, using a program on which the parallax image generation method is recorded on a recording medium such as a flexible disk or the like.

FIG. 21A shows an example of a physical format of a flexible disk that is a recording medium main body. FIG. 21B shows the frontal external appearance and cross-sectional structure of a flexible disk, and a flexible disk. The flexible disk FD is stored in a case F. Tracks Tr are formed concentrically from the outer circumference to the inner circumference on a surface of the disk, and each of the tracks is divided into 16 sectors Se in an angular direction. Accordingly, on the flexible disk FD on which the program is stored, the program is recoded in an allotted region in the flexible disc FD.

Furthermore, FIG. 21C shows a configuration for recording the program into the flexible disk FD and reproducing the program from the flexible disk FD. When the program for implementing the parallax image generation method is recorded on the flexible disk FD, the program is written from a computer system Cs to the flexible disk FD via a flexible disk drive FDD. Furthermore, when constructing the parallax image generation method in the computer system Cs using the program in the flexible disk FD, the program is read from the flexible disk FD and transferred to the computer system Cs using the flexible disk drive FDD.

Although the flexible disk is used as a recording medium in the description, an optical disc may be used instead. Furthermore, the recording medium is not limited to the above. As long as the program is recorded, any recording medium may be used, such as an IC card and a ROM cassette.

Other Modification

Although the parallax image generation device and the parallax image generation method according to the present invention have been described based on each of the embodiments, the present invention is not limited to these embodiments. The scope of the present invention includes other embodiments that are obtained by making various modifications that those skilled in the art could think of, to the present embodiments.

For example, although it is described that the correction target area is the left end portion and the right end portion of the depth image, the correction target area is not limited to the above. For example, the correction target area may be an upper end portion and a lower end portion of the depth image. Furthermore, for example, the correction target area may be the left end portion, the right end portion, the upper end portion, and the lower end portion of the depth image.

Furthermore, the correction target area is not limited to the area within the depth image, but may be defined as the area within the display screen 101, for example.

All of the numerical numbers used in the above embodiments are an example for describing the present invention specifically. Accordingly, the present invention is not limited to each numerical values used in the above embodiments.

Furthermore, the parallax image generation method according to the present invention corresponds to the parallax image generation processing in FIG. 8 and the depth image correction processing in FIG. 9. The parallax image generation method according to the present invention does not necessarily include all of the corresponding steps in FIG. 8 or FIG. 9. Specifically, it is sufficient that the parallax image generation method according to the present invention includes minimum steps through which the advantageous effect of the present invention can be implemented.

Furthermore, the order of the steps to be executed in the parallax image generation method is an example for describing the present invention specifically, and the order may be different from the above. Furthermore, a part of the steps in the parallax image generation method and other steps may be executed independently from each other and in parallel.

It is to be noted that all or a part of each of the constituents of the parallax image generation device 100 are typically implemented as a large scale integration (LSI) that is an integrated circuit. The constituents may be integrated into one chip separately, or may be integrated into one chip to include a part or all of the constituents. Furthermore, the parallax image generation device 100 may be configured as an integrated circuit.

The name used here is LSI, however, it may also be called integrated circuit (IC), system LSI, super LSI, or ultra LSI depending on the difference in the degree of integration.

Moreover, ways to achieve integration are not limited to the LSI, and the integration may be achieved by a dedicated circuit or a general purpose processor and so forth. It is also possible to use a field programmable gate array (FPGA) that can be programmed after manufacturing the LSI, or a reconfigurable processor in which connection and setting of circuit cells inside the LSI can be reconfigured.

Furthermore, with advancement in semiconductor technology or a different technology derived from the semiconductor technology, a brand-new technology may replace LSI. The functional blocks can be integrated using such a technology. Application of biotechnology is one such possibilities.

The embodiments disclosed here should be considered not as limitary but as exemplary in all respects. The scope of the present invention is indicated not by the above description but by the scope of claims, and it is intended that meanings equivalent to the scope of claims and all changes within the scope of claims are included in the scope of the present invention.

INDUSTRIAL APPLICABILITY

The present invention can be used as a parallax image generation device by which unnatural depiction in an end portion of a three-dimensional image can be reduced without decreasing the size of the three-dimensional image.

REFERENCE SIGNS LIST

100 Parallax image generation device
101 Display screen
110 Depth value correction unit
120 Parallax image generation unit
200 Active shutter glasses
1000 Three-dimensional image viewing system

The invention claimed is:

1. A parallax image generation device for generating, from a two-dimensional image that is a processing target, two parallax images necessary for depicting a three-dimensional image, the parallax images having mutual parallax, the device comprising:
   an obtainment unit configured to obtain a depth image which is defined by a plurality of pixels having depth values, each of the plurality of pixels having a corresponding one of the depth values;
   a depth value correction unit configured to define a width L from an end of the depth image based on input data, and perform correction processing on a depth value of a pixel in a correction target area, from among the depth values of the pixels which define the depth image, to shift a position corresponding to the depth value of the pixel to be closer to a display screen as the depth value of the pixel is located closer to an end of the depth image, the display screen being for displaying a parallax image, and the correction target area being an area having the width L from the end of the depth image; and
   a parallax image generation unit configured to generate a first parallax image and a second parallax image having mutual parallax, using the two-dimensional image and the depth image corrected through the correction processing.

2. The parallax image generation device according to claim 1,
   wherein the depth value correction unit is configured to perform the correction processing on, from among the depth values corresponding to the correction target area, a depth value which is for depicting a part of pixels of the three-dimensional image in front of the display screen for displaying the generated first parallax image and the generated second parallax image.

3. The parallax image generation device according to claim 1,
   wherein the depth value correction unit is configured to increase a value of the width L as the two-dimensional image has a larger horizontal size.

4. The parallax image generation device according to claim 1,
   wherein the depth value correction unit is configured to:
      extract, from among the depth values included in the correction target area, a depth value whose corresponding position is most separated from the display screen in front of the display screen; and increase a value of the width L as the position corresponding to the extracted depth value is separated from the display screen in front of the display screen.

5. The parallax image generation device according to claim 1,
   wherein the depth value correction unit is configured to perform the correction processing on at least one of (i) a depth value in the correction target area in a right end and a left end of the depth image and (ii) a depth value in the correction target area in an upper end and a lower end of the depth image.

6. The parallax image generation device according to claim 5,
   wherein the depth value correction unit is configured to increase a value of the width L for the correction target area in the right end and the left end of the depth image, when the two-dimensional image is an image captured while an imaging device is being panned.

7. The parallax image generation device according to claim 5,
   wherein the depth value correction unit is configured to increase a value of the width L for the correction target area in the upper end and the lower end of the depth image, when the two-dimensional image is an image captured while an imaging device is being tilted.

8. The parallax image generation device according to claim 6,
   wherein the depth value correction unit is configured to increase a value of the width L for the corresponding correction target area as the imaging device is being panned faster.

9. The parallax image generation device according to claim 6,
   wherein the depth value correction unit is configured to expand, from among the correction target areas in the ends of the depth image, the correction target area in a direction in which the imaging device faces to be larger than the correction target area on the other side.

10. The parallax image generation device according to claim 1,
    wherein the depth value correction unit is configured to correct, from among the depth values which define the depth image, a depth value located closest to the end of the depth image to be a value for depicting a pixel in the display screen for displaying the first parallax image and the second parallax image.

11. A parallax image generation method for generating, from a two-dimensional image that is a processing target, two parallax images necessary for depicting a three-dimensional image, the parallax images having mutual parallax, the method comprising:
    obtaining a depth image which is defined by a plurality of pixels having depth values, each of the plurality of pixels having a corresponding one of the depth values;

defining a width L from an end of the depth image based on input data, and correcting a depth value of a pixel in a correction target area, from among the depth values of the pixels which define the depth image, to shift a position corresponding to the depth value of the pixel to be closer to a display screen as the depth value of the pixel is located closer to an end of the depth image, the display screen being for displaying a parallax image, and the correction target area being an area having the width L from the end of the depth image; and generating a first parallax image and a second parallax image having mutual parallax, using the two-dimensional image and the depth image corrected in the correcting.

12. A non-transitory computer-readable recording medium on which a program is recorded which causes a computer to execute a program for generating, from a two-dimensional image that is a processing target, two parallax images necessary for depicting a three-dimensional image, the parallax images having mutual parallax, the program causing the computer to execute:

obtaining a depth image which is defined by a plurality of pixels having depth values, each of the plurality of pixels having a corresponding one of the depth values;

defining a width L from an end of the depth image based on input data, and correcting a depth value of a pixel in a correction target area, from among the depth values of the pixels which define the depth image, to shift a position corresponding to the depth value of the pixel to be closer to a display screen as the depth value of the pixel is located closer to an end of the depth image, the display screen being for displaying a parallax image, and the correction target area being an area having the width L from the end of the depth image; and generating a first parallax image and a second parallax image having mutual parallax, using the two-dimensional image and the depth image corrected in the correcting.

13. An integrated circuit for generating, from a two-dimensional image that is a processing target, two parallax images necessary for depicting a three-dimensional image, the parallax images having mutual parallax, the integrated circuit comprising:

an obtainment unit configured to obtain a depth image which is defined by a plurality of pixels having depth values, each of the plurality of pixels having a corresponding one of the depth values;

a depth value correction unit configured to define a width L from an end of the depth image based on input data, and perform correction processing on a depth value of a pixel in a correction target area, from among the depth values of the pixels which define the depth image, to shift a position corresponding to the depth value of the pixel to be closer to a display screen as the depth value of the pixel is located closer to an end of the depth image, the display screen being for displaying a parallax image, and the correction target area being an area having the width L from the end of the depth image; and a parallax image generation unit configured to generate a first parallax image and a second parallax image having mutual parallax, using the two-dimensional image and the depth image corrected through the correction processing.

14. The parallax image generation device according to claim 7, wherein the depth value correction unit is configured to increase a value of the width L for the corresponding correction target area as the imaging device is being tilted faster.

* * * * *